United States Patent
Song et al.

(10) Patent No.: US 12,010,683 B2
(45) Date of Patent: Jun. 11, 2024

(54) TRANSMISSION OF A SECOND ACK AFTER FAILURE OF FIRST ACK

(71) Applicant: LG ELECTRONICS INC., Seoul (KR)

(72) Inventors: Taewon Song, Seoul (KR); Kiseon Ryu, Seoul (KR); Jeongki Kim, Seoul (KR); Jinsoo Choi, Seoul (KR); Suhwook Kim, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 505 days.

(21) Appl. No.: 17/286,662

(22) PCT Filed: Oct. 28, 2019

(86) PCT No.: PCT/KR2019/014253
§ 371 (c)(1),
(2) Date: Apr. 19, 2021

(87) PCT Pub. No.: WO2020/091331
PCT Pub. Date: May 7, 2020

(65) Prior Publication Data
US 2021/0368491 A1 Nov. 25, 2021

Related U.S. Application Data

(60) Provisional application No. 62/751,695, filed on Oct. 28, 2018.

(51) Int. Cl.
*H04W 72/20* (2023.01)
*H04L 1/18* (2023.01)
(Continued)

(52) U.S. Cl.
CPC .............. *H04W 72/20* (2023.01); *H04L 1/18* (2013.01); *H04L 5/0055* (2013.01);
(Continued)

(58) Field of Classification Search
CPC ..... H04W 72/20; H04W 28/04; H04W 84/12; H04W 76/11; H04W 76/15; H04L 1/18; H04L 5/0055
See application file for complete search history.

(56) References Cited

U.S. PATENT DOCUMENTS

2014/0254349 A1* 9/2014 Jia ..................... H04W 28/0252
370/216
2015/0282005 A1 10/2015 Du et al.
(Continued)

FOREIGN PATENT DOCUMENTS

KR 101523145 5/2015

OTHER PUBLICATIONS

PCT International Application No. PCT/KR2019/014253, International Search Report dated Feb. 5, 2020, 4 pages.

*Primary Examiner* — Omar J Ghowrwal
(74) *Attorney, Agent, or Firm* — LEE, HONG, DEGERMAN, KANG & WAIMEY

(57) ABSTRACT

In a wireless local area network (LAN) system, a first station (STA) may check the transfer failure of a first acknowledgement (ACK) signal for a first frame, the signal being received through a first link. The first STA may transmit report information related to the transfer failure of the first ACK signal to a second STA through a second link. Here, the report information may include identification information associated with the first link. The first STA may receive a second frame from the second STA through the first link.
(Continued)

The first STA may transmit a second ACK signal for the second frame to the second STA through the first link on a narrowband.

12 Claims, 30 Drawing Sheets

(51) Int. Cl.
| | | |
|---|---|---|
| *H04L 5/00* | (2006.01) | |
| *H04W 28/04* | (2009.01) | |
| *H04W 76/11* | (2018.01) | |
| *H04W 76/15* | (2018.01) | |
| *H04W 84/12* | (2009.01) | |

(52) U.S. Cl.
CPC ............ *H04W 28/04* (2013.01); *H04W 76/11* (2018.02); *H04W 76/15* (2018.02); *H04W 84/12* (2013.01)

(56) References Cited

U.S. PATENT DOCUMENTS

| | | | |
|---|---|---|---|
| 2016/0255656 A1* | 9/2016 | Lou | ................... H04L 1/0003 370/335 |
| 2018/0184233 A1 | 6/2018 | Alpert et al. | |
| 2018/0206143 A1 | 7/2018 | Patil et al. | |
| 2018/0278697 A1 | 9/2018 | Cariou et al. | |
| 2020/0221483 A1* | 7/2020 | Zhang | ................... H04W 72/21 |
| 2021/0168831 A1* | 6/2021 | Wilhelmsson | ....... H04J 11/0066 |

* cited by examiner

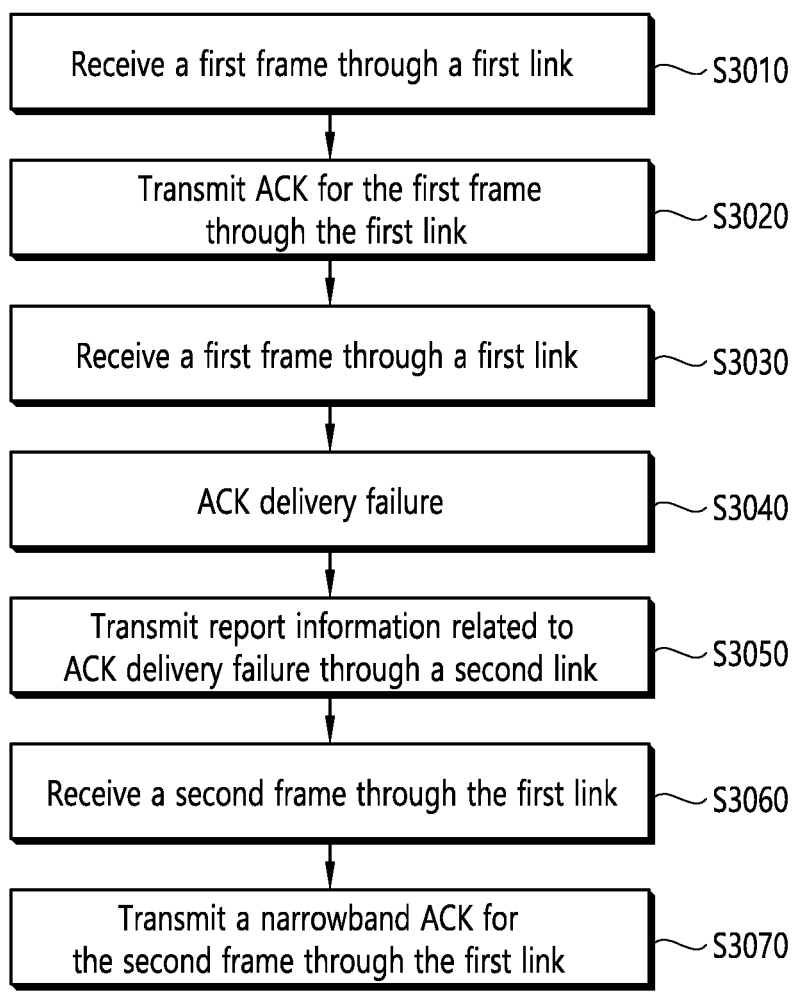

TRANSMISSION OF A SECOND ACK AFTER FAILURE OF FIRST ACK

CROSS-REFERENCE TO RELATED APPLICATIONS

This application is the National Stage filing under 35 U.S.C. 371 of International Application No. PCT/KR2019/014253, filed on Oct. 28, 2019, which claims the benefit of U.S. Provisional Application No. 62/751,695 filed on Oct. 28, 2018, the contents of which is incorporated by reference herein in its entirety.

BACKGROUND OF THE DISCLOSURE

Field of the Disclosure

The present specification relates to transmission of a response signal using a multi-link in a wireless local area network (LAN) system.

Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

The present specification proposes to improve a conventional wireless LAN (WLAN) or technical features that can be utilized in a new communication standard. For example, the new communication standard may be an extreme high throughput (EHT) standard that is currently being discussed. The EHT standard may use a newly proposed increased bandwidth, an improved PHY protocol data unit (PPDU) structure, an improved sequence, a hybrid automatic repeat request (HARQ) technique, a multilink, and the like.

SUMMARY

A method in a Wireless Local Area Network (LAN) system performed based on various embodiments is related to technical features in which transmission/reception of information related to a delivery failure is performed by a STA (e.g., an AP or a non-AP STA) supporting a multi-link (or multi-band). For instance, a first STA may confirm a delivery failure of a first acknowledgment (ACK) signal for a first frame received through a first link. The first STA may transmit, to a second STA, report information related to the delivery failure of the first ACK signal through a second link. The report information may include identification information related to the first link. The first STA may receive a second frame from the second STA through the first link. The first STA may transmit, to the second STA, a second ACK signal for the second frame in a narrowband through the first link.

Advantageous Effects

According to an example according to the present specification, a receiving STA receiving a frame through a multilink may confirm an ACK delivery failure caused by power imbalance. The receiving STA may report information related to the ACK delivery failure to the transmitting STA through another link. Thereafter, the receiving STA may increase the transmission power of the response signal by transmitting the response signal for frame reception in a narrow band. According to an example of the present specification, a method of reporting an ACK delivery failure through another link and transmitting an ACK in a narrow band in a multilink transmission situation may enable efficient signal transmission/reception.

BRIEF DESCRIPTION OF THE DRAWINGS

FIG. 30 is a flowchart illustrating an embodiment of an operation of the second STA 120 (or 110) according to FIG. 27.

DESCRIPTION OF EXEMPLARY EMBODIMENTS

In the present specification, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

In the present specification, parentheses may indicate "for example". Specifically, "control information (EHT-Signal)" may mean that "EHT-Signal" is proposed as an example of the "control information." Further, the "control information (i.e., EHT-signal)" may also mean that the "EHT-signal" is proposed as an example of "control information."

The following examples of the present specification may be applied to various wireless communication systems. For example, the following examples of the present specification may be applied to a wireless local area network (WLAN) system. For example, the present specification may be applied to IEEE 802.11a/g/n/ac or IEEE 802.11ax. The present specification may also be applied to a newly proposed EHT standard or IEEE 802.11be. Further, the present specification may be applied to a new WLAN stand which has enhanced IEEE 802.11be.

Hereinafter, in order to describe a technical feature of the present specification, a technical feature applicable to the present specification will be described.

Figure 1:
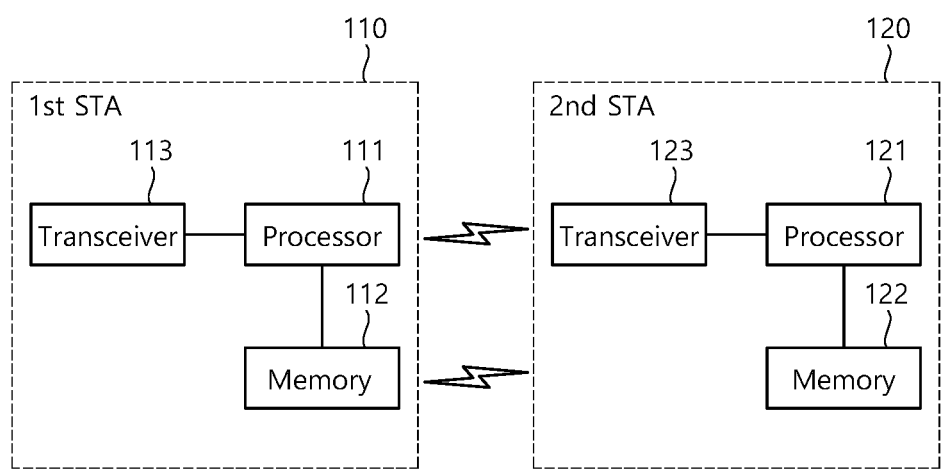
FIG. 1 shows an example of a transmitting apparatus and/or receiving apparatus of the present specification.

FIG. 1 shows an example of a transmitting apparatus and/or receiving apparatus of the present specification.

In the example of FIG. 1, various technical features described below may be performed. FIG. 1 relates to two stations (STAs). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may operate as an AP or a non-AP. That is, the STAs 110 and 120 of the present specification may operate as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like.

The STAs 110 and 120 of the present specification may include a medium access control (MAC) conforming to the IEEE 802.11 standard and a physical layer interface for a radio medium.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110.

For example, an operation of a device indicated as a non-AP (or User-STA) in the specification described below may be performed in the second STA 120. For example, if the second STA 110 is the non-AP the operation of the device indicated as the non-AP may be controlled by the processor 121 of the first STA 120, and a related signal may be transmitted or received through the transceiver 123 controlled by the processor 121 of the second STA 120. In addition, control information related to the operation of the AP or a TX/RX signal of the AP may be stored in the memory 122 of the first STA 120.

Figure 2:
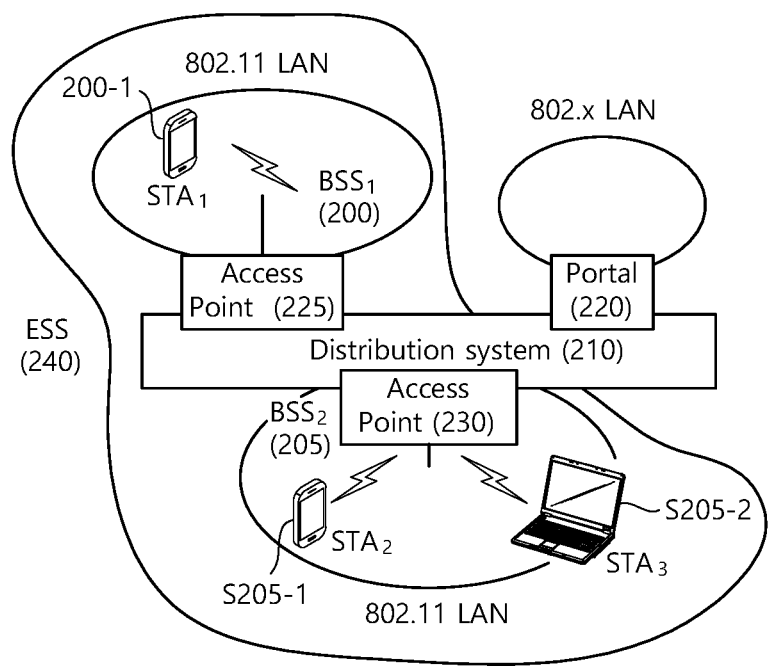
FIG. 2 is a conceptual view illustrating the structure of a wireless local area network (WLAN).
Figure 2:
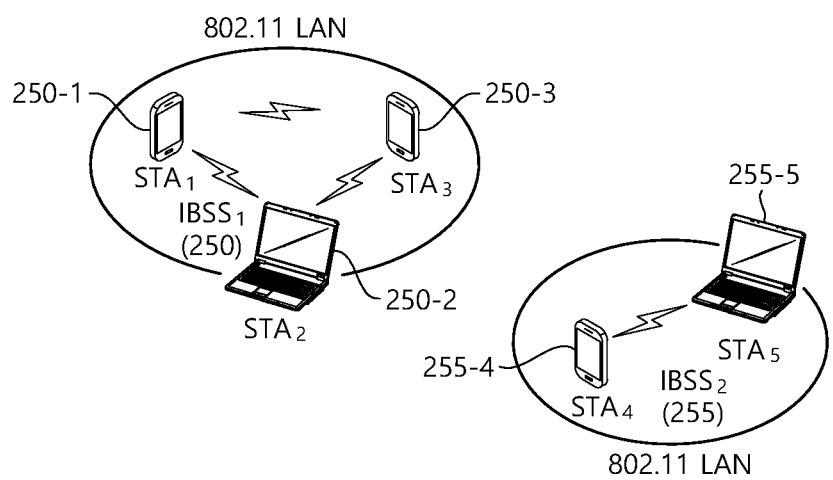

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
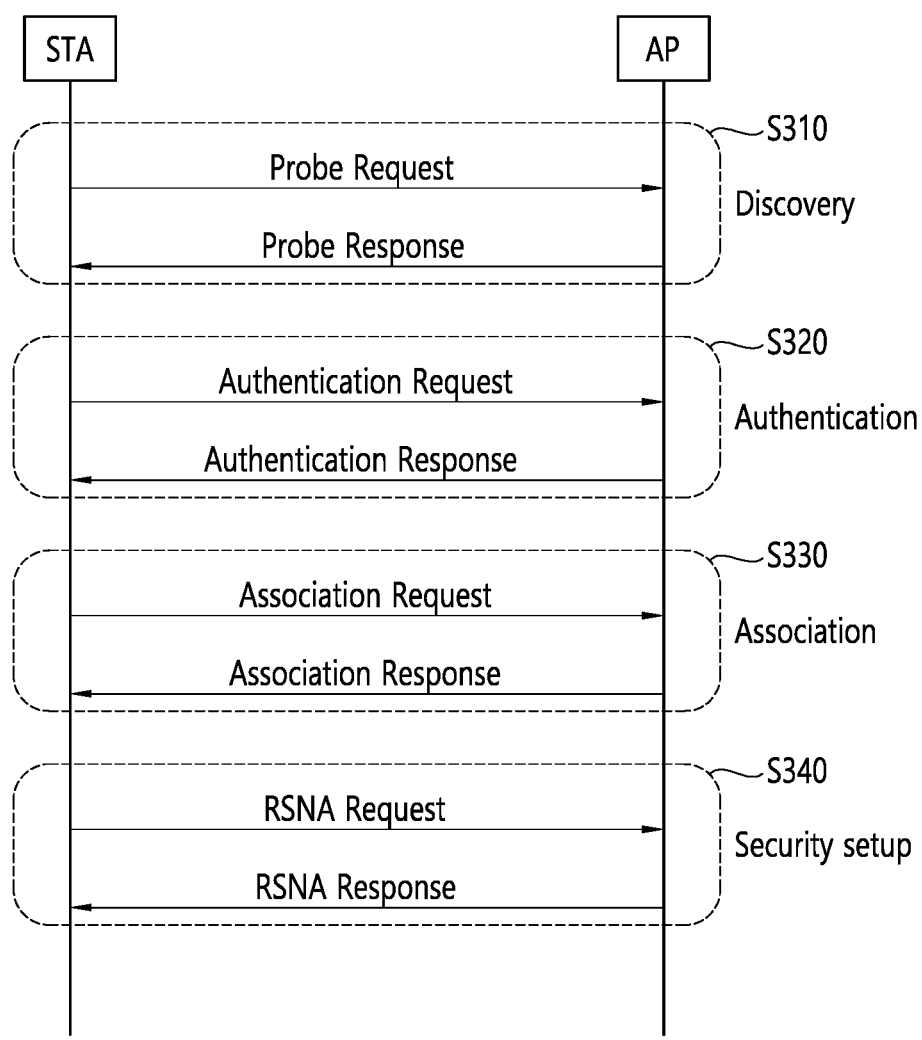
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
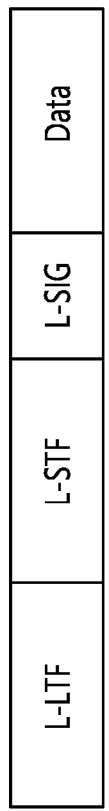
FIG. 4 illustrates an example of a PPDU used in an IEEE standard.
Figure 4:
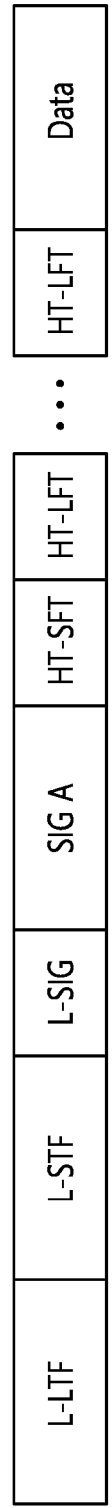
Figure 4:
Figure 4:
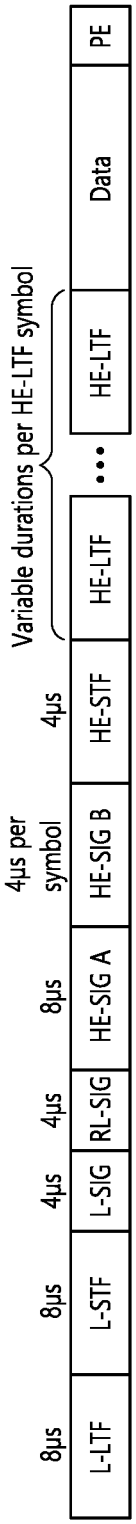

FIG. 4 illustrates an example of a PPDU used in an IEEE standard.

As illustrated in FIG. 4, various types of PHY protocol data units (PPDUs) are used in IEEE a/g/n/ac standards. Specifically, a LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
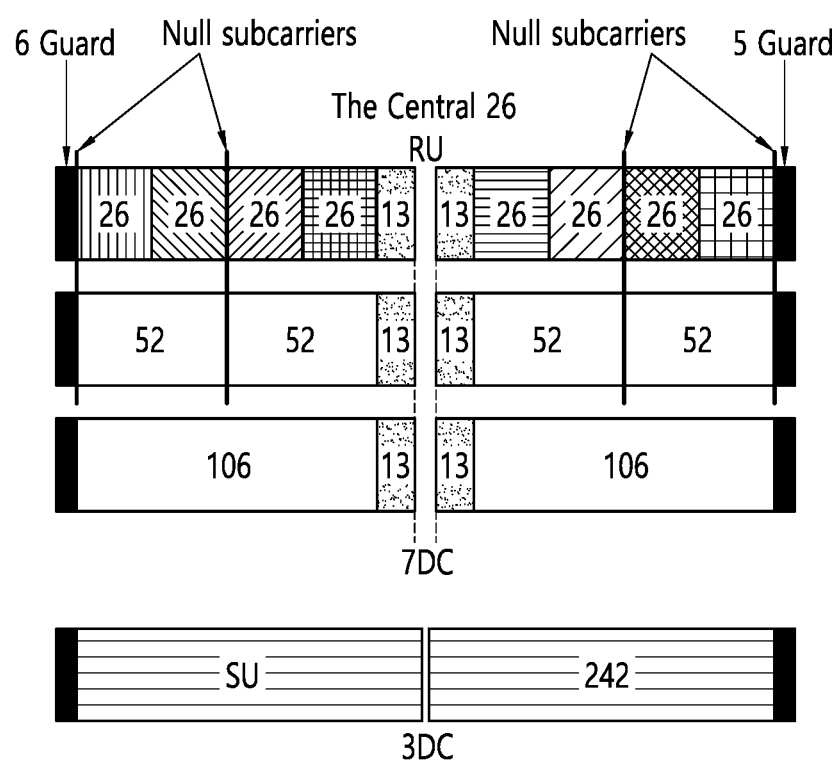
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
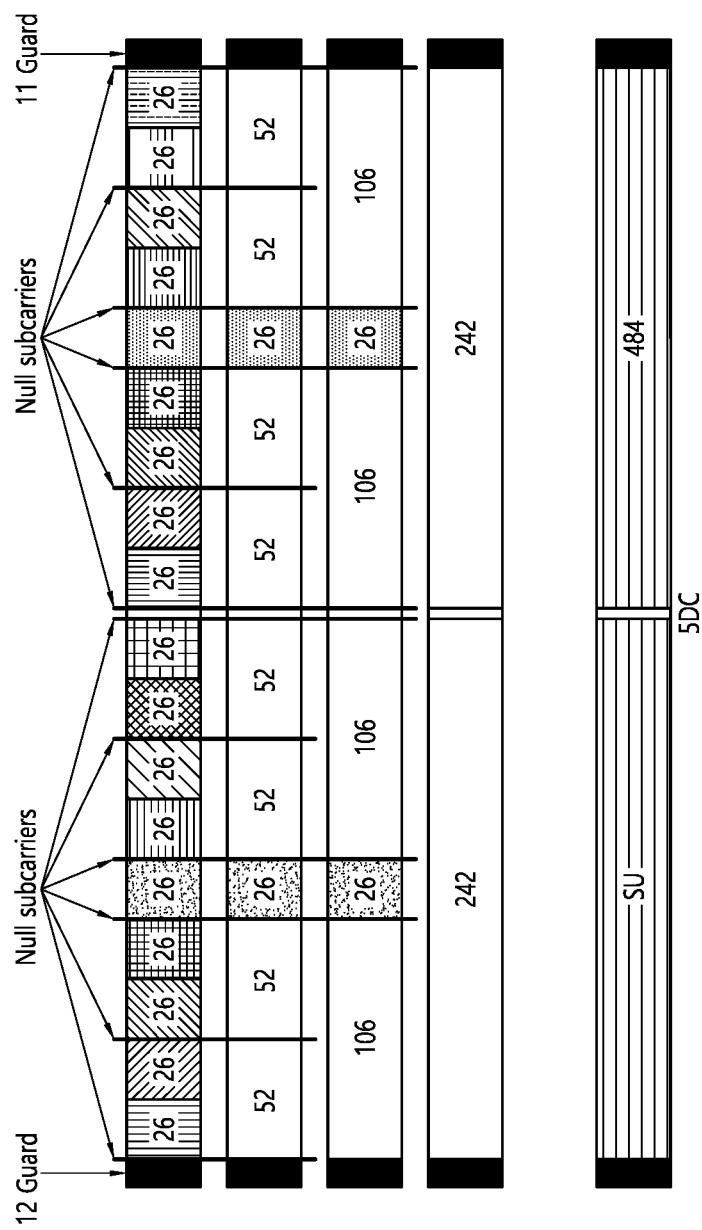
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
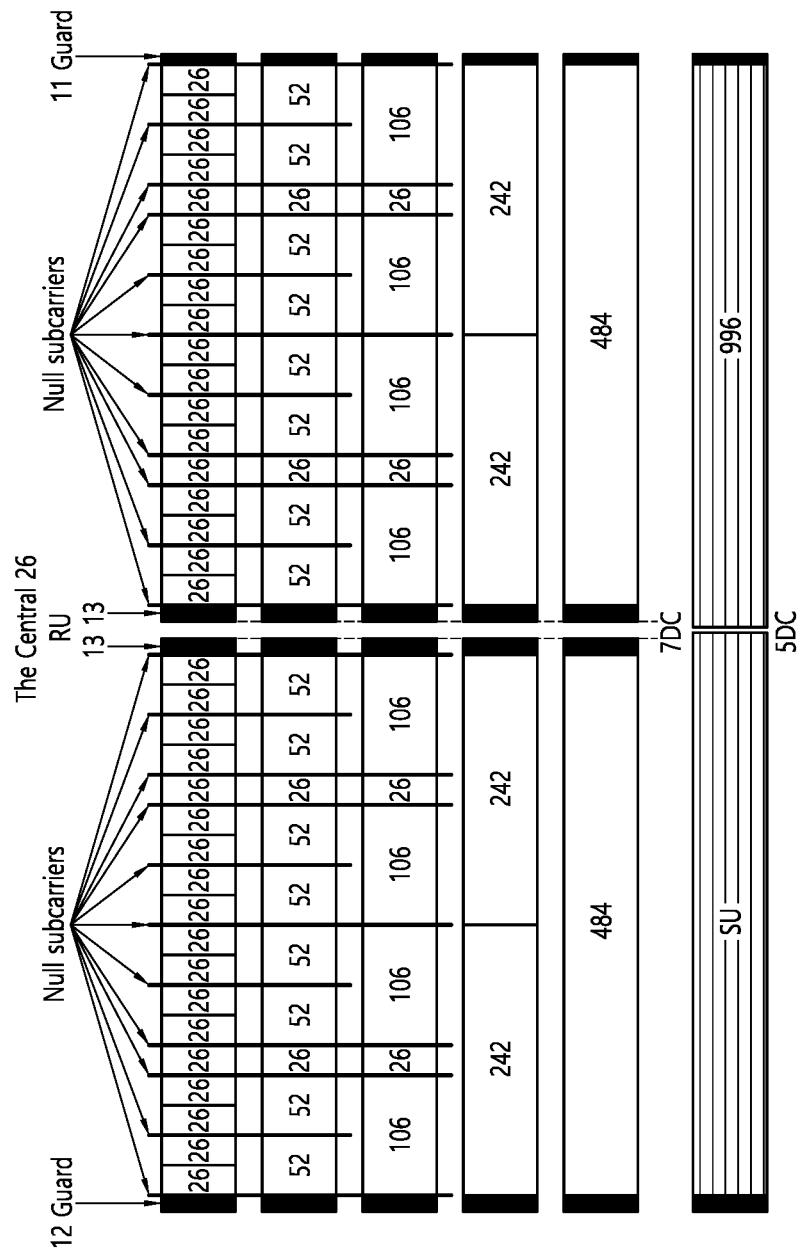
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
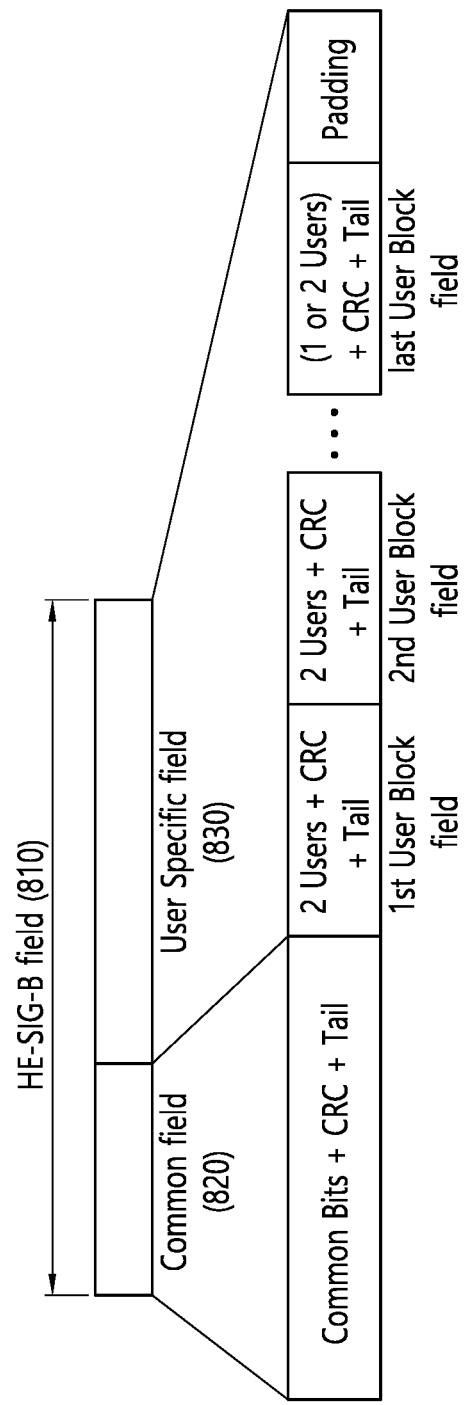
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 25 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information. For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01010$y_2y_1y_0$ | | 106 | | 26 | 52 | | 26 | 26 | | 8 |
| 01011$y_2y_1y_0$ | | 106 | | 26 | 52 | | 52 | | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
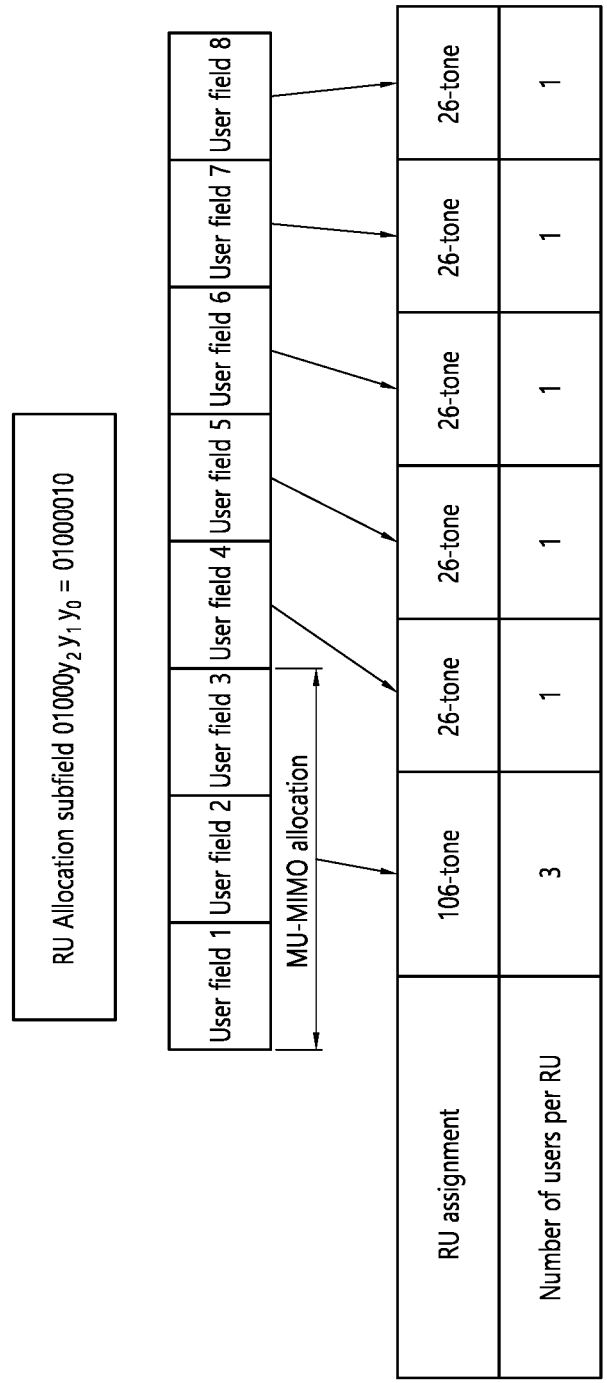
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format.

The first format or the second format may include bit information of the same length (e.g., 21 bits).

Figure 10:
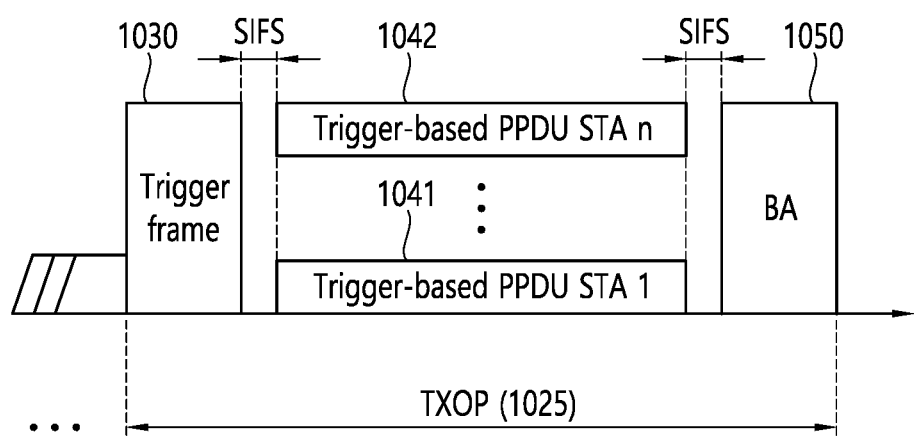
FIG. 10 illustrates an operation based on UL-MU.

FIG. 10 illustrates an operation based on UL-MU. As illustrated, a transmitting STA (e.g., AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
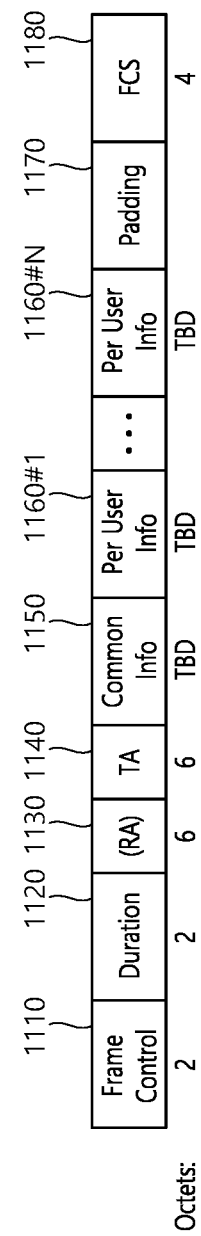
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of an STA.

In addition, an RA field 1130 may include address information of a receiving STA of a corresponding trigger frame, and may be optionally omitted. A TA field 1140 may include address information of an STA (e.g., AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of an SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
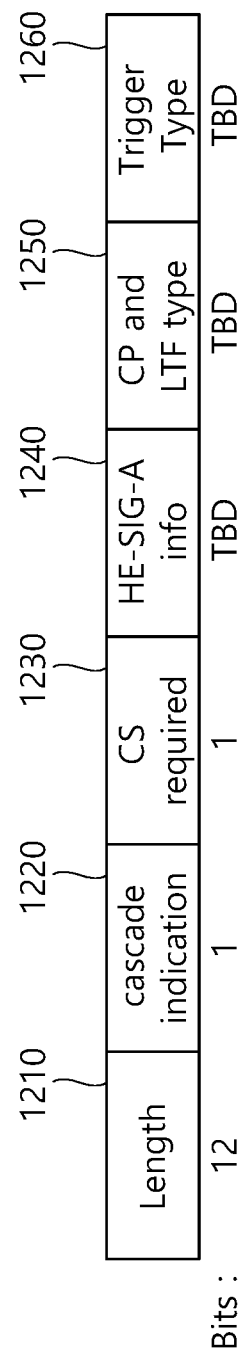
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or an NAV or the like is necessarily considered in a situation where a receiving device which has received a corresponding trigger frame transmits a corresponding uplink PPDU.

An HE-SIG-A information field 1240 may include information for controlling content of an SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
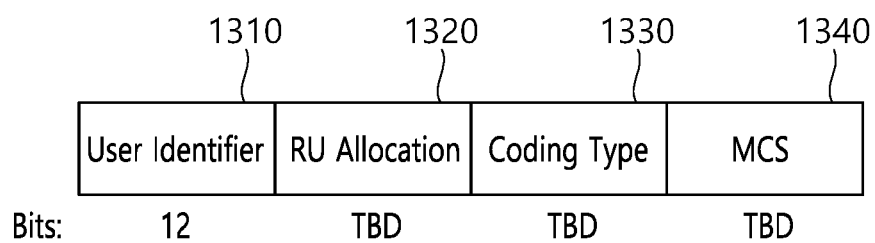
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of an STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
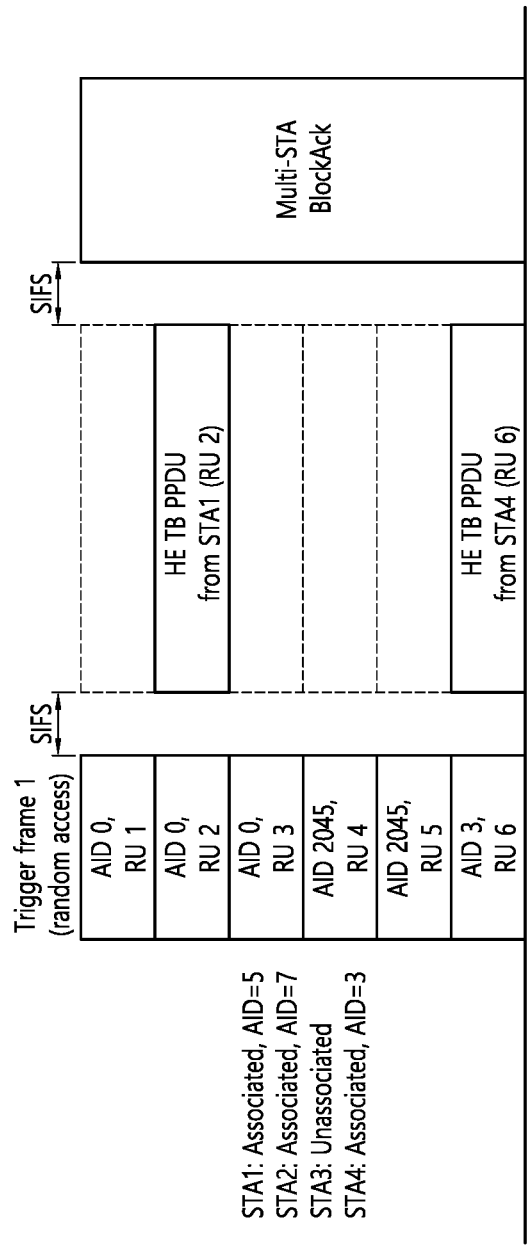
FIG. 14 describes a technical feature of the UORA scheme.

FIG. 14 describes a technical feature of the UORA scheme.

A transmitting STA (e.g., AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of an STA1 is decreased to 0, and the STA1 randomly selects the 2nd RU resource (AID 0, RU 2). In addition, since an OBO counter of an STA2/3 is greater than 0, an uplink resource is not allocated to the STA2/3. In addition, regarding an STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
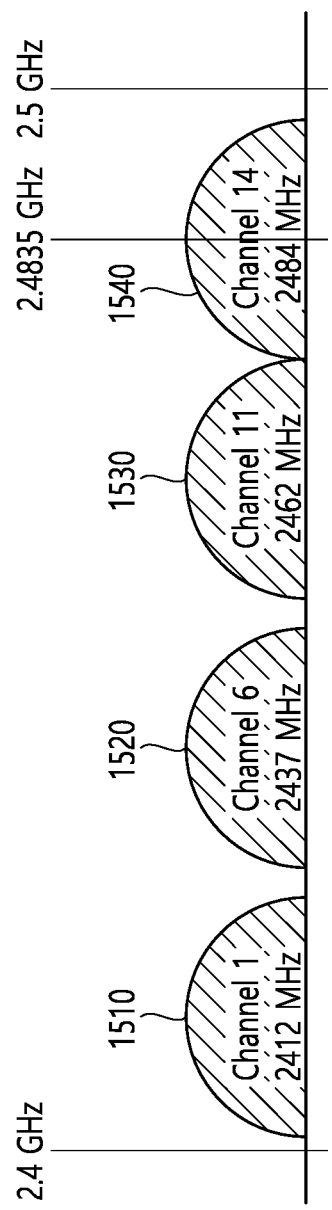
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
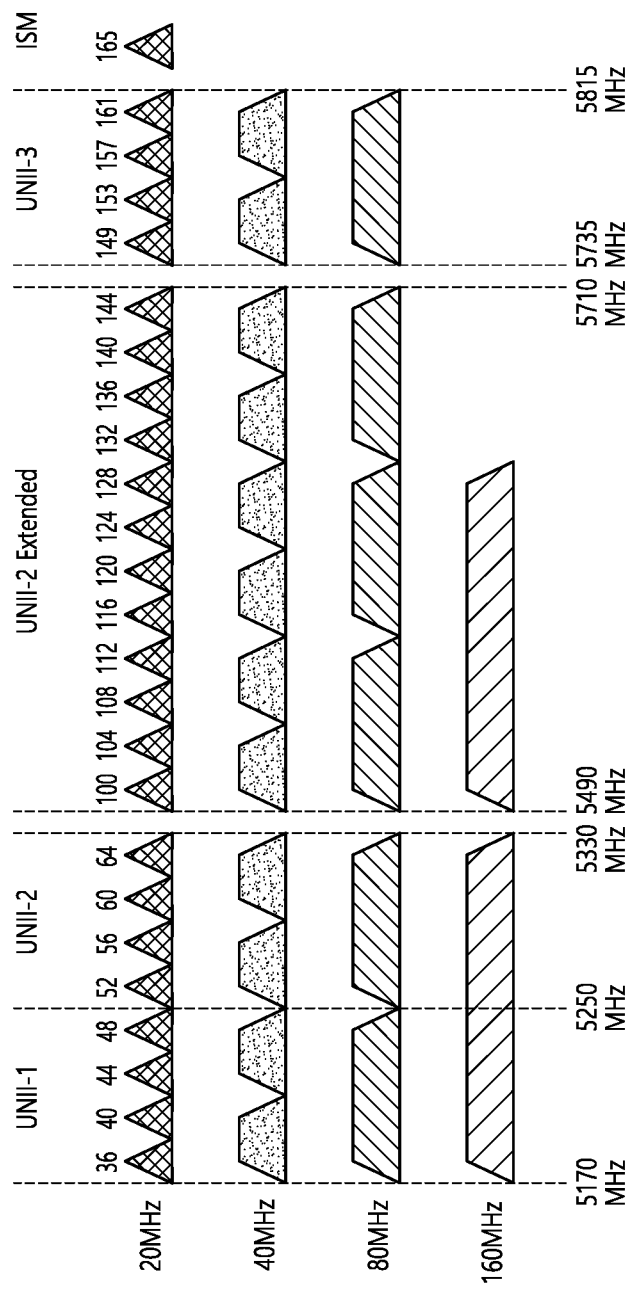
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
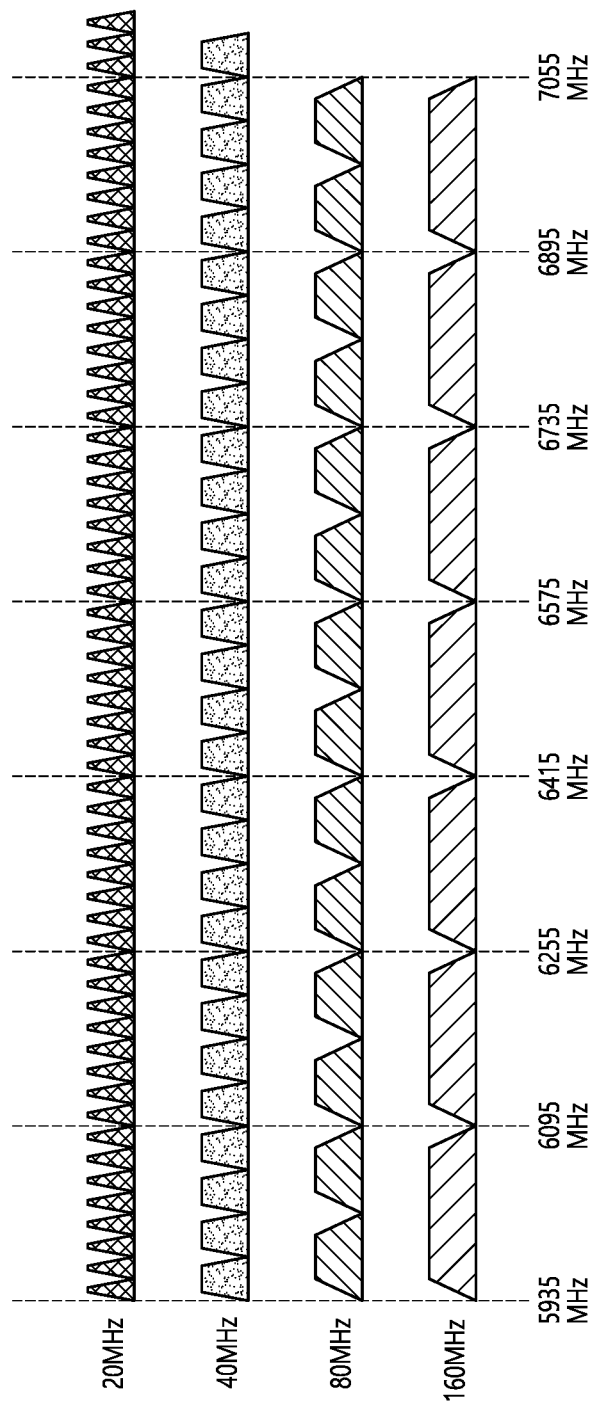
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N)GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in an STA of the present specification will be described.

Figure 18:
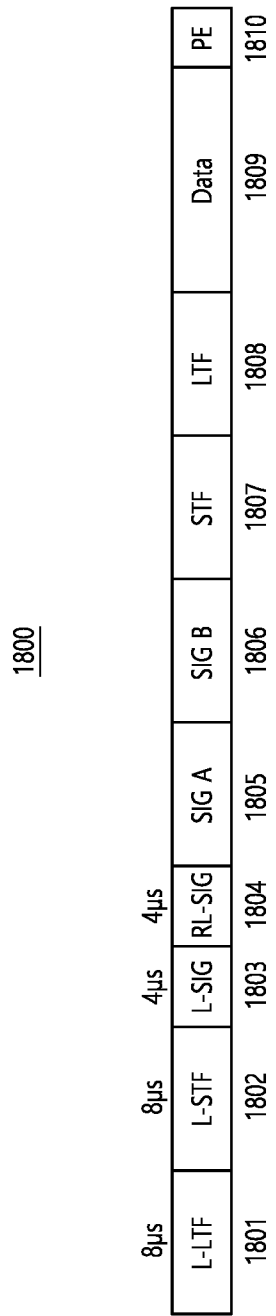
FIG. 18 illustrates an example of a PPDU used in the present specification.

FIG. 18 illustrates an example of a PPDU used in the present specification.

The PPDU 1800 depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields 1801 to 1810 depicted in FIG. 18 may be referred to as various terms. For example, a SIG A field 1805 may be referred to an EHT-SIG-A field, a SIG B field 1806 may be referred to an EHT-SIG-B, a STF field 1807 may be referred to an EHT-STF field, and an LTF field 1808 may be referred to an EHT-LTF.

The subcarrier spacing of the L-LTF, L-STF, L-SIG, and RL-SIG fields 1801, 1802, 1803, and 1804 of FIG. 18 can be set to 312.5 kHz, and the subcarrier spacing of the STF, LTF, and Data fields 1807, 1808, and 1809 of FIG. 18 can be set to 78.125 kHz. That is, the subcarrier index of the L-LTF, L-STF, L-SIG, and RL-SIG fields 1801, 1802, 1803, and 1804 can be expressed in unit of 312.5 kHz, and the subcarrier index of the STF, LTF, and Data fields 1807, 1808, and 1809 can be expressed in unit of 78.125 kHz.

The SIG A and/or SIG B fields 1805 and 1806 of FIG. 18 may include additional fields (e.g., a SIG C field or one control symbol, etc.). The subcarrier spacing of all or part of the SIG A and SIG B fields 1805 and 1806 may be set to 312.5 kHz, and the subcarrier spacing of the remaining part/fields may be set to 78.125 kHz.

In the PPDU of FIG. 18, the L-LTF 1801 and the L-STF 1802 may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU 1800. For example, when the PPDU 1800 is a non-HT, HT, VHT PPDU or an EHT PPDU, a value of the length field may be determined as a multiple of 3. For example, when the PPDU 1800 is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field 1803. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG 1804 which is identical to the L-SIG 1803. BPSK modulation may be applied to the RL-SIG 1804. The receiving STA may figure out that the RX PPDU 1800 is the HE PPDU or the EHT PPDU, based on the presence of the RL-SIG 1804.

After the RL-SIG 1804 of FIG. 18, for example, EHT-SIG-A or one control symbol may be inserted. A symbol contiguous to the RL-SIG 1804 (i.e., EHT-SIG-A or one control symbol) may include 26 bit information and may further include information for identifying the type of the EHT PPDU. For example, when the EHT PPDU is classified into various types (e.g., an EHT PPDU supporting an SU mode, an EHT PPDU supporting a MU mode, an EHT PPDU related to the Trigger Frame, an EHT PPDU related to an Extended Range transmission, etc.), Information related to the type of the EHT PPDU may be included in a symbol contiguous to the RL-SIG 1804.

A symbol contiguous to the RL-SIG 1804 may include, for example, information related to the length of the TXOP and information related to the BSS color ID. For example, the SIG-A field 1805 may be contiguous to the symbol contiguous to the RL-SIG 1804 (e.g., one control symbol). Alternatively, a symbol contiguous to the RL-SIG 1804 may be the SIG-A field 1805.

For example, the SIG-A field 1805 may include 1) a DL/UL indicator, 2) a BSS color field which is an identifier of a BSS, 3) a field including information related to the remaining time of a current TXOP section, 4) a bandwidth field including information related to the bandwidth, 5) a field including information related to an MCS scheme applied to an HE-SIG B 1806, 6) a field including information related to whether a dual subcarrier modulation (DCM) scheme is applied to the HE-SIG B 1806, 7) a field including information related to the number of symbols used for the HE-SIG B 1806, 8) a field including information related to whether the HE-SIG B is generated over the entire band, 9) a field including information related to the type of the LTF/STF 1807 and 1808, 10) a field indicating the length of the HE-LTF and a CP length.

An STF 1807 of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF 1807 of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 μs, and a periodicity signal of 3.2 μs may be repeated 5 times to become a second type STF having a length of 16 μs. Only some of the first to third type EHT-STF sequences may be used. In addition, the EHT-LTF field may also have first, second, and third types (ie, 1x, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 μs. In addition, Guard Intervals (GIs) with various lengths (e.g., 0.8/1/6/3.2 μs) may be applied to the first/second/third type LTF.

Information related to the type of STF and/or LTF (including information related to GI applied to the LTF) may be included in the SIG A field and/or the SIG B field of FIG. 18.

The PPDU 1800 of FIG. 18 may be determined (or identified) as an EHT PPDU based on the following method.

A receiving STA may determine a type of an RX PPDU 1800 as the EHT PPDU, based on the following aspect. For example, the RX PPDU may be determined as the EHT PPDU: 1) when a first symbol after an L-LTF signal 1801 of the RX PPDU is a BPSK symbol; 2) when RL-SIG in which the L-SIG 1803 of the RX PPDU 1800 is repeated is detected; and 3) when a result of applying "module 3" to a value of a length field of the L-SIG 1803 of the RX PPDU 1800 is detected as "0". When the RX PPDU 1800 is determined as the EHT PPDU, the receiving STA may detect, based on bit information included in a symbol after the RL-SIG 1804 of FIG. 18, a type of the EHT PPDU (e.g., an SU/MU/Trigger-based/Extended Range type). In other words, the receiving STA may determine the RX PPDU as the EHT PPDU, based on: 1) a first symbol after an L-LTF signal 1801, which is a BPSK symbol; 2) RL-SIG 1804 contiguous to the L-SIG field 1803 and identical to L-SIG 1803; and 3) L-SIG 1803 including a length field in which a result of applying "modulo 3" is set to "0."

For example, the receiving STA may determine the type of the RX PPDU 1800 as the EHT PPDU, based on the following aspect. For example, the RX PPDU 1800 may be determined as the HE PPDU: 1) when a first symbol after an L-LTF signal 1801 is a BPSK symbol; 2) when RL-SIG in which the L-SIG 1803 is repeated is detected; and 3) when a result of applying "module 3" to a value of a length field of the L-SIG 1803 is detected as "1" or "2."

For example, the receiving STA may determine the type of the RX PPDU 1800 as a non-HT, HT, and VHT PPDU, based on the following aspect. For example, the RX PPDU may be determined as the non-HT, HT, and VHT PPDU: 1) when a first symbol after an L-LTF signal 1801 is a BPSK symbol; 2) when RL-SIG in which L-SIG is repeated is not detected; and 3) when a result of applying "modulo 3" to the length value of the L-SIG 1803 is detected as "0."

The STA (AP and/or non-AP STA) of the present disclosure may support multilink communication. The STA supporting multilink communication may simultaneously perform communication through multiple links. That is, the STA supporting multilink communication may perform communication through multiple links during a first time period and may perform communication through only one of the multiple links during a second time period.

Multilink communication may mean communication supporting a plurality of links, and one link can include a channel (for example, 20/40/80/160/240/320 MHz channels) defined in a 2.4 GHz band, a 5 GHz band, a 6 GHz band, and/or a specific band described below. Hereinafter, the concept of conventional channel bonding will be described.

For example, in the IEEE 802.11n system, 40 MHz channel bonding may be performed by combining two 20 MHz channels. In addition, 40/80/160 MHz channel bonding may be performed in the IEEE 802.11ac system.

For example, an STA may perform a channel bonding for a primary 20 MHz channel (P20 channel) and a secondary 20 MHz channel (S20 channel). In the channel bonding process, a backoff count/counter may be used. The backoff count value is selected to be a random value and may be decreased during a backoff interval. In general, when the backoff count value becomes 0, the STA is able to attempt to access the channel.

When the P20 channel is determined to be in the idle state during the backoff interval and the backoff count value for the P20 channel becomes 0, an STA performing the channel bonding determines whether the S20 channel has been maintained to be idle for a certain period (e.g., point coordination function (PIFS)). If the S20 channel is in the idle state, the STA may perform a channel bonding for the P20 channel and the S20 channel. That is, the STA may transmit a signal (PPDU) through a 40 MHz channel (i.e., a 40 MHz bonding channel) including the P20 channel and the S20 channel.

Figure 19:
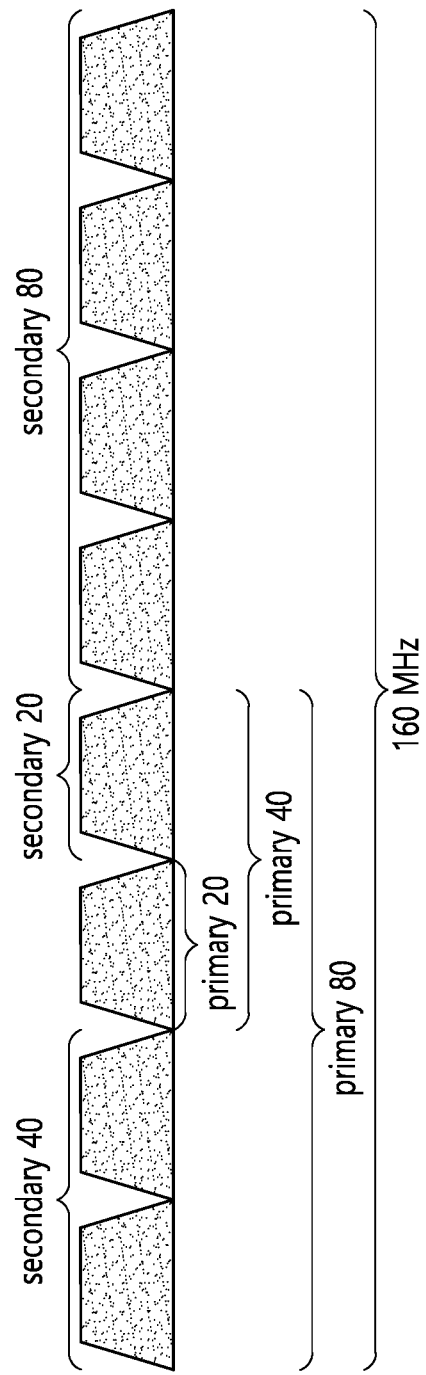
FIG. 19 shows an example of channel bonding.

FIG. 19 shows an example of channel bonding. As shown in FIG. 19, the Primary 20 MHz channel and the Secondary 20 MHz channel may constitute/configure a 40 MHz channel (Primary 40 MHz channel) through the channel bonding. That is, the bonded 40 MHz channel may include a Primary 20 MHz channel and a Secondary 20 MHz channel.

The channel bonding may be performed when a channel contiguous to the primary channel is in an idle state. In other words, while the Primary 20 MHz channel, the Secondary 20 MHz channel, the Secondary 40 MHz channel, and the Secondary 80 MHz channel can be sequentially bonded, the channel bonding may not be performed when the Secondary 20 MHz channel is determined to be in a busy state. In addition, when the secondary 20 MHz channel is in the idle state and the secondary 40 MHz channel is determined to be in the busy state, channel bonding may be performed only for the primary 20 MHz channel and the secondary 20 MHz channel.

Hereinafter, the technical features of the multilink and aggregation will be described.

The STA (e.g., an AP and/or a non-AP STA) of the present specification may support multilink communication. That is, the STA may simultaneously transmit and receive signals through the first link and the second link based on the multi-links. That is, the multilink (or multilink scheme/technique) may mean a technique in which one STA simultaneously transmits and receives signals through a plurality of links. For example, transmitting a signal through one link and receiving a signal through another link may also be included in the above-mentioned multilink communication. An STA supporting multilink may use a plurality of links in a first time period and use only one link in a second time period.

Figure 20:
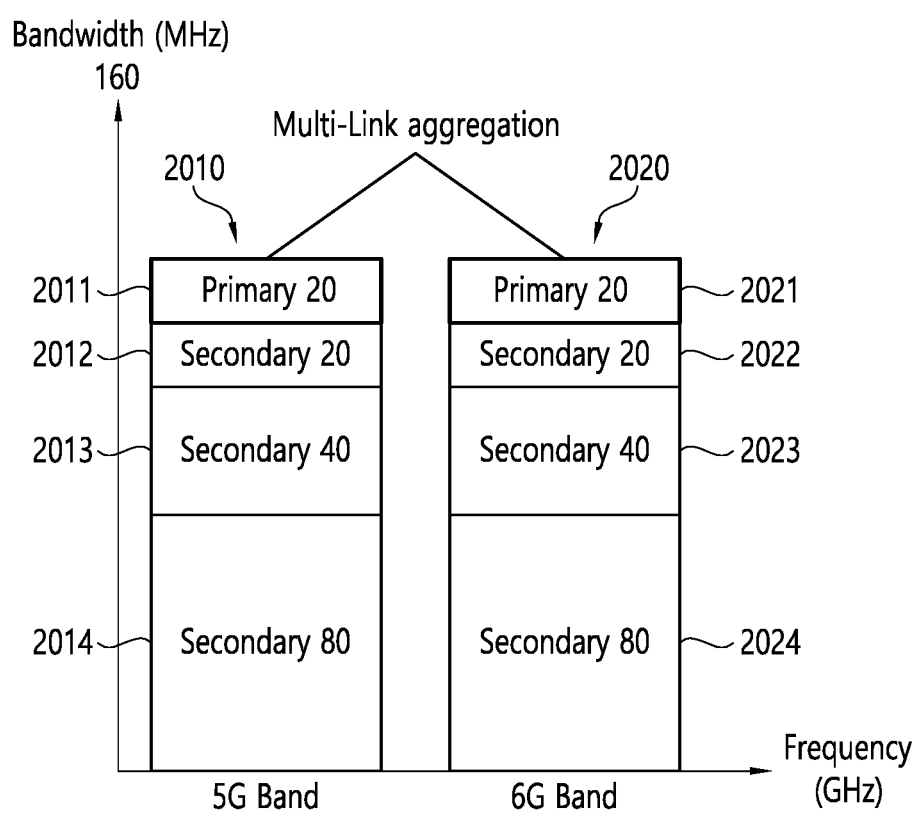
FIG. 20 is a diagram explaining technical features of links applied to the multilink.

FIG. 20 is a diagram explaining technical features of links applied to the multilink.

A link used for multilink may have at least one of the following technical features. Technical features related to links described below are exemplary, and additional technical features may be applied.

For example, each link used for multilink may be included in a different band. That is, when a multilink scheme/technique supporting the first and second links is used, each of the first link and the second link can be included in a 2.4 GHz band, a 5 GHz band, or a 6 GHz band, but the first link and the second link can be included in different bands.

Referring to FIG. 20, a first link 2010 and a second link 2020 may be used for multilink (scheme/technique). The first link 2010 of FIG. 20 may be included in, for example, a 5 GHz band. The second link 2020 of FIG. 20 may be included in, for example, a 6 GHz band.

Each link used for multilink (scheme/technique) may be included in the same band. For example, when the multilink supporting the first/second/third link is used, all links can be included in the same band, or the first/second links can be included in the first band and the third link can be included in the second band.

The multilink (scheme/technique) may be configured based on different RF modules (e.g., IDFT/IFFT blocks). Additionally or alternatively, a plurality of links included in the multilink may be discontinuous in the frequency domain. That is, a frequency gap may exist in a frequency domain corresponding to the first link and a frequency domain corresponding to the second link among the plurality of links.

As shown in FIG. 20, the first link 2010 may include a plurality of channels 2011, 2012, 2013, and 2014. The STA may apply the existing channel bonding to a plurality of channels 2011, 2012, 2013, and 2014. That is, when a plurality of channels 2011, 2012, 2013, and 2014 are in an idle state for a specific time period (for example, during PIFS), a plurality of channels 2011, 2012, 2013, and 2014 can be used as one bonding channel and said one bonding channel may operate as one link 2010. Alternatively, a part of a plurality of channels 2011, 2012, 2013, 2014 may operate as one link 2010 through the preamble puncturing technique/scheme which was proposed in the IEEE 802.11ax standard. The above-described features can be applied to the second link 2020 in the same manner. The above-described features can be applied equally to the second link 2020.

An upper limit may be set on the number of channels (and/or maximum bandwidth) included in one link used for multilink. For example, as in the example of FIG. 20, up to four channels may constitute/configure one link. Additionally or alternatively, the maximum bandwidth of one link may be 160 MHz, 240 MHz, or 320 MHz. Additionally or alternatively, one link may include contiguous channels only. The specific values above are optional and subject to change.

A procedure for identifying/specifying/determining a link used for multilink is related to an aggregation (or channel aggregation) procedure. The STA may aggregate a plurality of links to perform multilink communication. That is, the STA may perform: 1) a first procedure for identifying/specifying/determining a link aggregated for multilink; and 2) a second procedure for performing multilink communication through the identified/specific/determined link. The STA may perform the first and second procedures as separate procedures, or may simultaneously perform the first and second procedures through one single step/action.

Hereinafter, the technical features of the first procedure will be described.

The STA may transmit/receive information related to a plurality of links configuring a multilink. For example, the AP may use Beacon, Probe Response, Association Response, and/or other control frames to identify information related to a band (and/or a channel) that supports multilink capability. For example, when the AP can perform communication by aggregating some channels in a 5 GHz band and some channels in a 6 GHz band, identification information related to channels (e.g., in 5 GHz and 6 GHz bands) that can be aggregated may be delivered by the AP to the user STA.

For example, the User STA can also transmit information related to a band (and/or a channel) that supports multilink capability through Probe Request, Association Response, and/or other control frames. For example, when the user STA can perform communication by aggregating some channels in a 5 GHz band and some channels in a 6 GHz band, identification information related to channels (e.g., in 5 GHz and 6 GHz bands) that can be aggregated may be delivered by the User STA to the AP.

One of a plurality of links configuring a multilink may operate as a primary link. Primary Link can perform various functions. For example, when the primary link' backoff-value becomes 0 (and/or the primary link has been in the idle state during the recent PIFS), the STA may perform aggregation on another link. Information related to this primary link can also be included in Beacon, Probe Request/Response, and Association Request/Response.

User-STA/AP can specify/determine/acquire a band (and/or channel) on which multilink is performed through a negotiation procedure for exchanging information related to User-STA/AP's capability.

For example, the STA can specify/determine/acquire, through the negotiation procedure, the first candidate band/channel for the first link, the second candidate band/channel for the second link, and the third candidate band/channel for the third link.

Thereafter, the STA may perform a procedure of identifying/specifying/determining a link aggregated for multilink. For example, the STA can aggregate at least two bands/channels based on a backoff-count of (and/or a clear channel assessment (CCA) sensing result (i.e., Busy/Idle)) of a first candidate band/channel, a second candidate band/channel, and a third candidate band/channel. For example, when the backoff count value of the first candidate band/channel becomes 0, the STA may aggregate the second candidate band/channel that has maintained the idle state for a specific period (during the recent PIFS). That is, the STA may determine/specify a first candidate band/channel as a first link for multilink and a second candidate band/channel as a second link for multilink. Accordingly, the STA may perform multilink communication through the first and second links.

Hereinafter, the technical features of the second procedure will be described.

For example, when the STA decides to aggregate the first and second links, the STA may perform multilink communication through the first and second links. For example, the STA may transmit PPDUs of the same length (e.g., same time duration) through both the first and second links. Alternatively, the STA may receive the transmission PPDU through the first link and receive the reception PPDU through the second link during the overlapping time period. The STA performs communication through all aggregated links in a specific time period, and may use only one link in another time period.

When data frame is transmitted and/or received, problems such as radio channel fluctuation, a congested environment, and transmission power imbalance between STAs may occur. If the data frame is not successfully transmitted/received due to the above problem or the like, retransmission of the data frame may be performed. For example, when the transmitting STA transmits a data frame to the receiving STA but does not receive an acknowledgment (ACK) from the receiving STA, the transmitting STA may retransmit the data frame to the receiving STA. In this case, the transmitting STA may not be able to distinguish whether the data frame has not been delivered to the receiving STA or whether the transmitting STA has not received the ACK transmitted by the receiving STA.

In EHT, a standard discussed after IEEE 802.11ax, a multilink environment in which more than one frequency band is simultaneously used is considered. An STA supporting multilink may use one or more bands (e.g., 2.4 GHz, 5 GHz, 6 GHz, 60 GHz, etc.) simultaneously or alternately. An STA supporting multilink may transmit information related to data transmission/reception in the first band (e.g., management/control information) through the second band.

Hereinafter, an ACK delivery failure that may occur in a data transmission/reception process between STAs supporting multilinks will be described.

Figure 21:
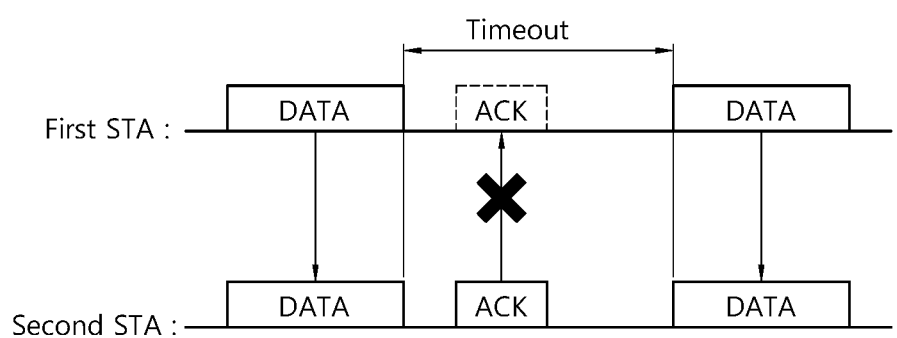
FIG. 21 is a diagram illustrating an example of an ACK delivery failure.

FIG. 21 is a diagram illustrating an example of an ACK delivery failure.

Referring to FIG. 21, an arrow indicates a transmission direction of a frame (e.g., DATA), and when received data is indicated by a dotted line, it means that the data reception has failed.

For example, a first STA 110 (or 120) may transmit a frame (e.g., DATA) to a second STA 120 (or 110), and the second STA 120 (or 110) may receive a frame from the first STA 110 (or 120). Since the second STA 120 (or 110) has successfully received the frame, the second STA 120 (or 110) may transmit an ACK for the received frame to the first STA 110 (or 120). The first STA 110 (or 120) may fail to receive an ACK from the second STA 120 (or 110). Since the first STA 110 (or 120) has not received the ACK from the second STA 120 (or 110), it may retransmit the frame to the second STA 120 (or 110) after a set time (e.g., Timeout). In an environment in which it is difficult for the first STA 110 (or 120) to successfully receive an ACK, the first STA 110 (or 120) may retransmit the frame several times, even though the second STA 120 (or 110) has received the frame.

In FIG. 21, a problem in which a frame transmitted by the first STA 110 (or 120) to the second STA 120 (or 110) is successfully received at the second STA 120 (or 110), but the first STA 110 (or 120) fails to receive an ACK signal transmitted by the second STA 120 (or 110) to the first STA 110 (or 120). This problem can be due to, for example, power imbalance. The power imbalance may occur when the transmission power of the TX STA(s) transmitting a frame is greater than the transmission power of the RX STA(s) transmitting an ACK for the frame. That is, the power imbalance may indicate a case in which the frame transmission from the TX STA(s) with high TX power is successfully performed, but the ACK transmission from the RX STA(s) with relatively small transmit power fails. The power imbalance may occur in an edge area of AP coverage.

The first STA 110 (or 120) that did not receive the ACK due to the power imbalance may not distinguish: whether 1) the second STA 120 (or 110) did not successfully receive the frame; or 2) the second STA 120 (or 110) had successfully received the frame but the first STA 110 (or 120) failed to receive the ACK transmitted by the second STA 120 (or 110).

Meanwhile, in EHT, which is a standard discussed after IEEE 802.11ax, a multilink environment in which more than one band is simultaneously used is considered. When STAs 110 and 120 support multilink, one or more bands (e.g., 2.4 GHz, 5 GHz, 6 GHz, 60 GHz, etc.) can be used simultaneously or alternately. If the multilink is used, the transmission band can be increased, and Management/Control information of the current band can be transmitted to other bands.

An example of the present specification described below relates to a technical feature of transmitting/receiving data when the STAs 110 and 120 supporting multilink fail to transmit an ACK signal.

A first STA 110 (or 120) and a second STA 120 (or 110) may perform communication through first and second links. For example, the first and second links may be configured in any one of 2.4 GHz, 5 GHz, or 6 GHz frequency bands, respectively, and the first link and the second link may be configured in different frequency bands. For example, the first STA 110 (or 120) may set a first link and a second link to be used for communication with the second STA 120 (or 110), the second STA 120 (or 110) may receive multilink information including first link information and second link information from the first STA 110 (or 120). Alternatively, for example, the second STA 120 (or 110) may acquire/obtain the multilink information through a negotiation procedure for exchanging information related to their capabilities with first STA 110 (or 120). The specific procedure may be based on the first procedure and/or the second procedure of FIG. 20.

The first STA 110 (or 120) may confirm a delivery failure of a first ACK signal for a first frame received through a first link. For example, the first STA 110 (or 120) may receive a first frame from the second STA 120 (or 110) and transmit the first ACK signal for the received first frame to the second STA 120 (or 110). When the first STA 110 (or 120) receives the same first frame again from the second STA 120 (or 110) despite transmitting the first ACK signal, it can confirm the delivery failure of the first ACK signal. Here, the transmission failure of the first ACK signal may mean a case where the first STA 110 (or 120) transmits the first ACK signal, but thereafter the second STA 120 (or 110) does not successfully receive the first ACK signal.

The first STA 110 (or 120) may transmit, to the second STA 120 (or 110), report information related to the delivery failure of the first ACK signal through the second link. For example, the report information includes identification information related to the first link (e.g., information on the frequency band in which the first link is configured), information related to a request to change an ACK policy, and information related to a narrowband ACK transmission. A narrowband may mean 26 resource units (RUs) or 52 RUs.

The second STA 120 (or 110) may receive the report information from the first STA 110 (or 120) through the second link. Further, the second STA 120 (or 110) may confirm, based on the received report information, that the second STA 120 (or 110) has successfully received the first frame and that the first ACK signal transmitted by first STA 110 (or 120) has delivery-failed. Thereafter, the second STA 120 (or 110) may transmit a second frame to first STA 110 (or 120) through the first link and transmit a second ACK signal request message for the second frame to the first STA 110 (or 120). The second STA 120 (or 110) may request the first STA 110 (or 120) to transmit the second ACK signal in the narrowband. The second STA 120 (or 110) may transmit the second ACK signal for the second frame in the narrowband through the first link. The second ACK signal for the second frame may be included in a high efficiency multi-user PPDU (HE MU PPDU).

FIGS. 22 to 25 are flowcharts illustrating embodiments of a method of reporting information related to an ACK delivery failure.

A first STA 110 (or 120) and a second STA 120 (or 110) may perform communication through first and second links. For example, each of the first and second links may be configured in any one of 2.4 GHz, 5 GHz, or 6 GHz frequency bands, and the first link and the second link may be configured in different frequency bands. For example, the first STA 110 (or 120) may set a first link and a second link to be used for communication with the second STA 120 (or 110), and the second STA 120 (or 110) may receive multilink information including first link information and second link information from the first STA 110 (or 120). Alternatively, for example, the second STA 120 (or 110) may acquire/obtain multilink information through a negotiation procedure for exchanging information related to their capabilities with the first STA 110 (or 120). The specific procedure may be based on the first procedure and/or the second procedure of FIG. 20.

Referring to FIGS. 22 to 25, the first STA 110 (or 120) may transmit a first frame to the second STA 120 (or 110) through a first link and transmit a second frame to the second STA 120 (or 110) through the second link. The second STA 120 (or 110) may receive the first frame from the first STA 110 (or 120) through the first link and receive the second frame from the first STA 110 (or 120) through the second link. The second STA 120 (or 110) may transmit an ACK signal for the first frame to the first STA 110 (or 120) through the first link and transmit an ACK signal for the second frame to the first STA 110 (or 120) through the second link. While the second STA 120 (or 110) has successfully received both the first frame and the second frame, only an ACK signal for the first frame is successfully transmitted to the first STA 110 (or 120) (and an ACK signal for the second frame is not transmitted to the first STA). For example, the transmission power of the second STA 120 (or 110) in the second link may be relatively small compared to the transmission power of the first STA 110 (or 120) in the second link. Accordingly, the first frame of the first STA 110 (or 120) can be successfully transmitted to the second STA 120 (or 110), but the ACK signal for the first frame of the second STA 120 (or 110) may not be successfully transmitted to first STA 110 (or 120).

The first STA 110 (or 120) may receive an ACK signal for the first frame from the second STA 120 (or 110) through the first link. The first STA 110 (or 120) may fail to receive an ACK signal for the second frame transmitted through the second link. That is, a delivery failure of the ACK signal for the second frame may occur. Since the first STA 110 (or 120) has not received the ACK signal for the second frame, the second frame may be retransmitted to the second STA 120 (or 110) through the second link. Since the first STA 110 (or 120) has received the ACK signal for the first frame, it may transmit a third frame to the second STA 120 (or 110) through the first link.

The second STA 120 (or 110) may receive the third frame through the first link and the second frame through the second link. When the second STA 120 (or 110) receives the same second frame again despite transmitting the ACK signal for the second frame, the second STA 120 (or 110) can confirm that the transmission of the ACK signal for the second frame has failed in the second link. Alternatively, for example, when the second STA 120 (or 110) receives the same second frame n times (n is an integer greater than or equal to 2), it may confirm that the transmission of the ACK signal for the second frame has failed in the second link.

The second STA 120 (or 110) may transmit an ACK signal for the third frame to the first STA 110 (or 120) through the first link. Even if the second STA 120 (or 110) currently transmits signals to the first STA 110 (or 120) through the second link, it may confirm that there is a high possibility of signal transmission failure. Accordingly, the second STA 120 (or 110) may transmit information related to an ACK signal delivery failure for the second frame to the first STA 110 (or 120) through the first link. For example, information related to the ACK signal delivery failure for the second frame is transmitted from the second STA 120 (or 110) to the first STA 110 (or 120) through the first link after transmission of the ACK signal for the third frame.

Figure 22:
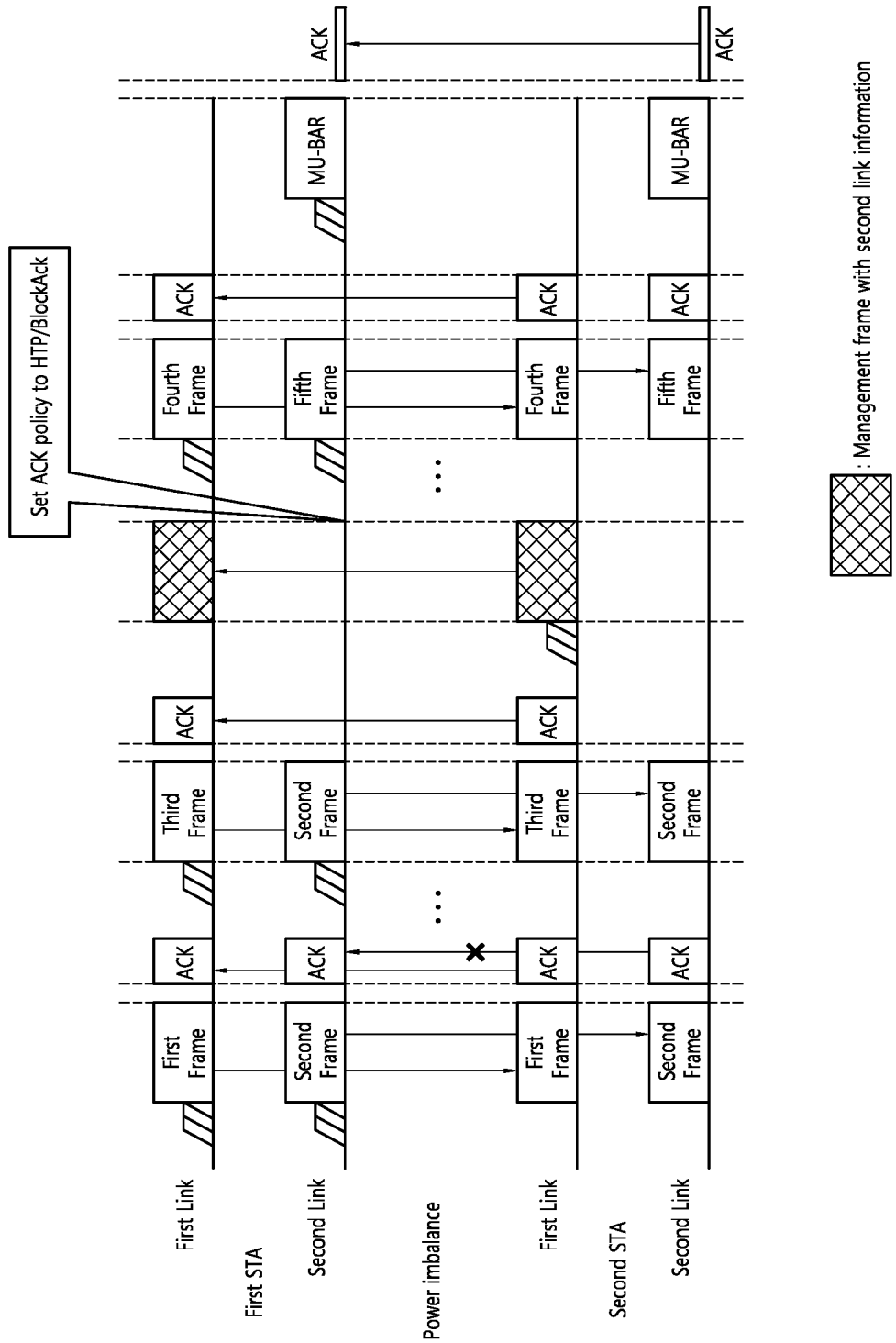
FIGS. 22 to 25 are flowcharts illustrating embodiments of a method of reporting information related to an ACK delivery failure.

For example, the information related to the ACK signal delivery failure for the second frame may include second link information as shown in FIG. 22. That is, the second STA 120 (or 110) may inform the first STA 110 (or 120), through the first link, that a delivery of the ACK signal has failed in the second link. For example, the information related to the ACK signal delivery failure for the second frame may include various information, such as information related to a successful reception of the second frame in the second STA 120 (or 110), or information related to the ACK signal delivery failure for the second frame.

Figure 23:
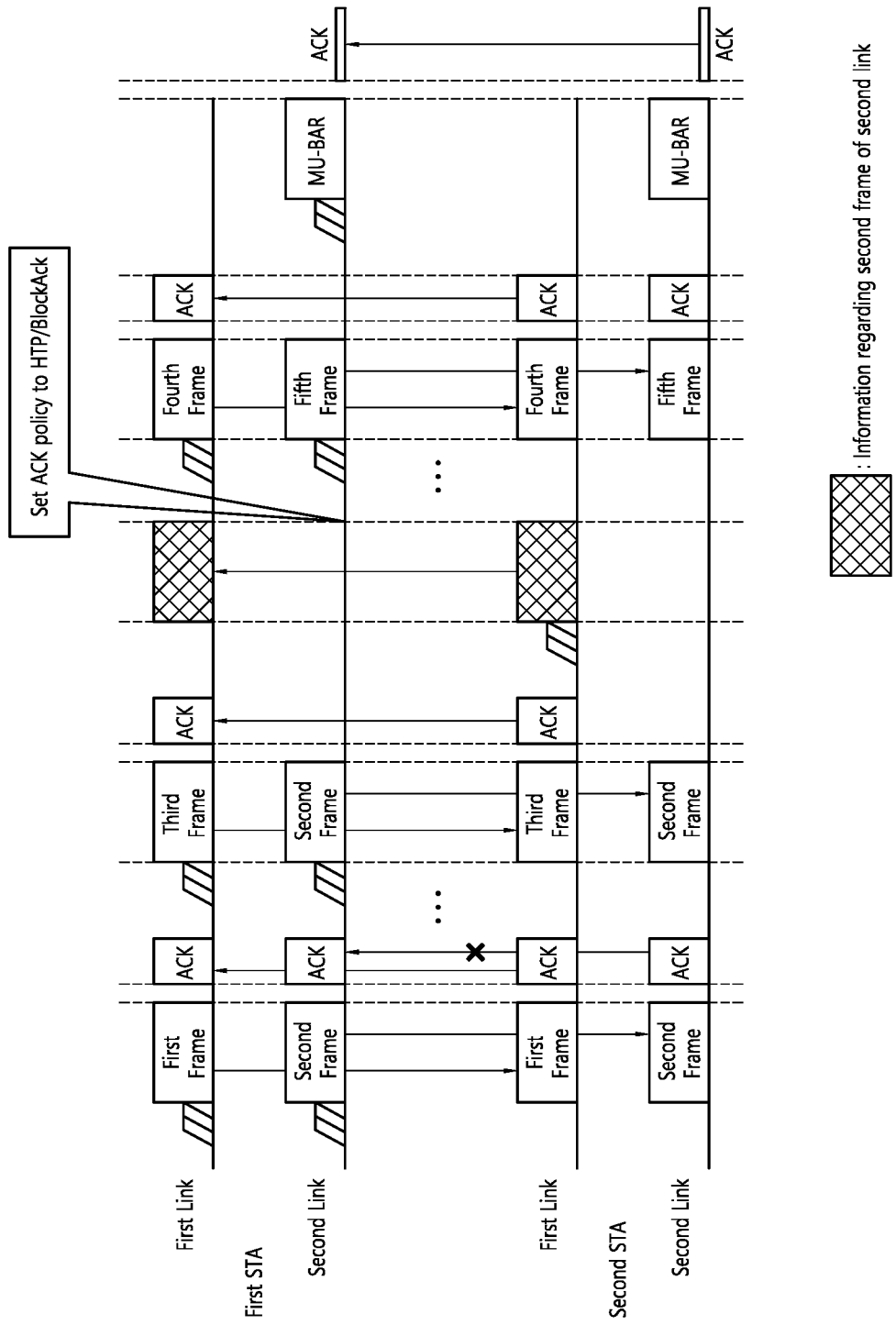

For example, the information related to the ACK signal delivery failure for the second frame may include information related to the second frame as shown in FIG. 23. Namely, the second STA 120 (or 110) may inform the first STA 110 (or 120), through the first link, of successful reception of the second frame. Namely, the second STA 120 (or 110) may transmit, through the first link, an ACK signal for the second frame transmitted in the second link.

Figure 24:
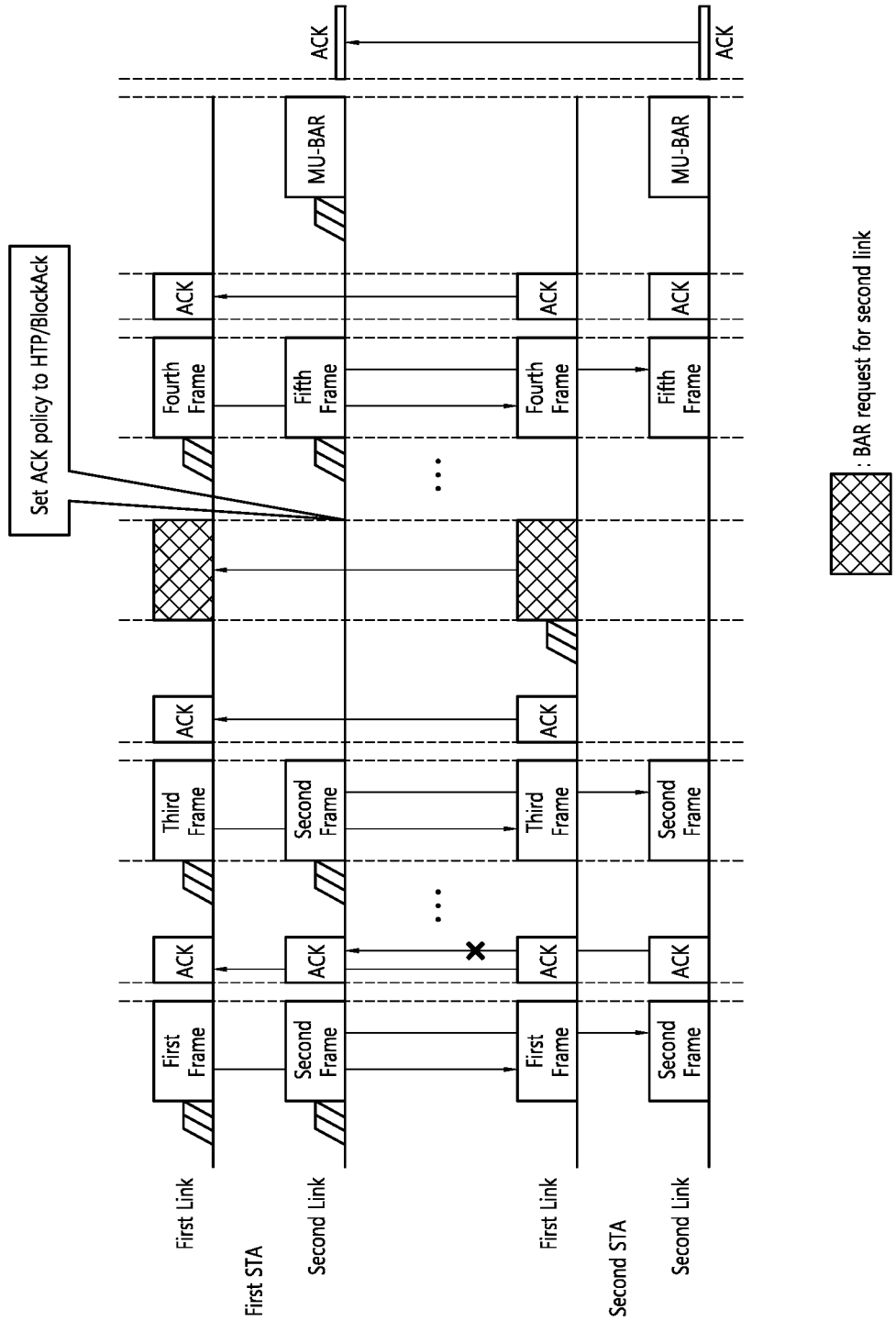

For example, the information related to the ACK signal delivery failure for the second frame may include information related to a signal transmission request of Block ACK Request (BAR) through the second link as shown in FIG. 24.

Figure 25:
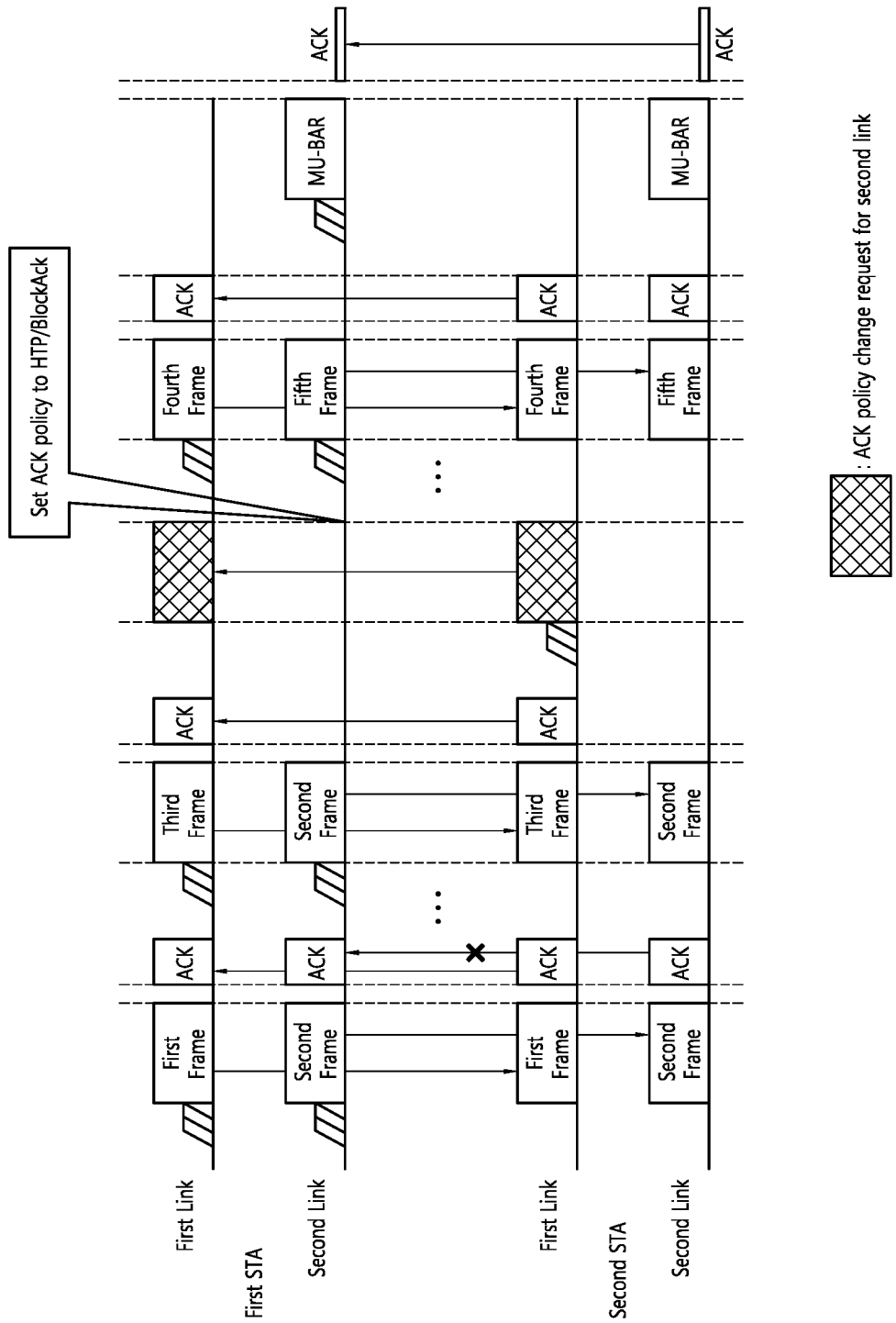

For example, the information related to the ACK signal delivery failure for the second frame may include information related to a request for ACK policy change in the second link as shown in FIG. 25. For example, the second STA 120 (or 110) may request the first STA 110 (or 120) to change the ACK policy so as not to transmit the ACK signal for the received frame even if the frame is received. Alternatively, for example, the second STA 120 (or 110) may request the first STA 110 (or 120) to change the ACK policy (e.g., Ack policy=HTP (01)/BA (11)) so that the ACK signal is transmitted only when the second STA 120 (or 110) receives a request (e.g., Block ACK Request (BAR), Multi-User (MU)-AR signal, etc.) for transmission of the ACK signal.

For example, the information related to the ACK signal delivery failure for the second frame may include delivery failure information of the ACK signal, or information related to that the second STA 120 (or 110) has successively/continuously received the same frame from the first STA 110 (or 120).

For example, the information related to the ACK signal delivery failure for the second frame may include narrowband RU allocation request information. Since the second STA 120 (or 110) has failed to transmit ACK to the first STA 110 (or 120), the ACK may request resource allocation for narrowband transmission in order to transmit the ACK in a narrowband.

Since the conventional ACK frame does not have a field containing band information or channel information, the information related to an ACK signal delivery failure for the second frame can be included in a QoS null frame, a management frame, and any new frame. The present specification does not limit a frame or a field where the information related to the ACK signal delivery failure for the second frame can be included.

For example, the second STA 120 (or 110), after obtaining a transmitter through contention based on EDCA (Enhanced Distributed Channel Access), may transmit information related to the ACK signal delivery failure for the second frame to the STA (110, 120). Alternatively, for example, the second STA 120 (or 110) may transmit, to the first STA 110 (or 120), information related to the ACK signal delivery failure for the second frame, without contention, in the already obtained TXOP.

For example, the second STA 120 (or 110) may include a first transceiver (e.g., an RF unit) transmitting a signal using a first frequency band and a second transceiver (e.g., an RF unit) transmitting a signal using a second frequency band. The first link may be configured in a first frequency band, and the second link may be configured in a second frequency band. When a frame loss occurs for the second frame transmitted through the second link, the second transceiver may inform the first transceiver of report information related to the frame loss of the second frame. For example, the second transceiver transmits, to the first transceiver, an element including information related to the frame loss for the second frame in the form of a Management MAC Protocol Data Unit (MMPDU) using On-Channel Tunneling (OCT). The OCT operation is specified in IEEE802.11 standard.

The first STA 110 (or 120) may receive, from the second STA 120 (or 110), information related to an ACK signal delivery failure for the second frame. The first STA 110 (or 120) may confirm, based on the information related to the ACK signal delivery failure for the second frame, that the second STA 120 (or 110) has successfully received the second frame through the second link and that the second STA 120 (or 110) has failed the ACK signal delivery for the second frame transmitted through the second link.

The first STA 110 (or 120) may determine that it is difficult to receive the ACK signal transmitted by the second STA 120 (or 110) in the second link. Accordingly, the first STA 110 (or 120) may change the ACK policy applied in the second link. For example, the first STA 110 (or 120) may change the ACK policy applied in the second link not to transmit the ACK signal for the received frame even if the second STA 120 (or 110) receives the frame. Alternatively, for example, the first STA 110 (or 120) may change the ACK policy applied in the second link (e.g., may set Ack policy=HTP(01))/BA (11)) so that the second STA 120 (or 110) transmits the ACK signal only when the second STA 120 (or 110) receives, from the first STA 110 (or 120), a request for ACK signal transmission (e.g., only when the second STA receives a Block ACK Request (BAR) signal from the first STA).

The first STA 110 (or 120) may transmit a fourth frame to the second STA 120 (or 110) through the first link, and transmit a fifth frame to the second STA 120 (or 110) through the second link. The second STA 120 (or 110) may receive the fourth frame from the first STA 110 (or 120) through the first link and the fifth frame from the first STA 110 (or 120) through the second link. The second STA 120 (or 110) may transmit an ACK signal for the fourth frame to the first STA 110 (or 120) through the first link. The second STA 120 (or 110) may not transmit, based on the changed ACK policy, an ACK signal for the fifth frame through the second link.

The first STA 110 (or 120) may transmit an ACK request signal (e.g., MU-BAR) for the fifth frame to the second STA 120 (or 110) through the second link. For example, the ACK request signal for the fifth frame may be transmitted after the first STA 110 (or 120) receives the ACK signal for the fourth frame. The ACK request signal for the fifth frame may include information related to a narrowband ACK transmission request for the fifth frame, narrowband resource allocation information, and second link identification information. For example, the first STA 110 (or 120) may transmit, based on Enhanced Distributed Channel Access (EDCA), an ACK request signal for the fifth frame to the second STA 120 (or 110) through the second link.

The second STA 120 (or 110) may receive an ACK request signal for the fifth frame from the first STA 110 (or 120) through the second link. The second STA 120 (or 110) may transmit, based on the ACK request signal for the fifth frame, the ACK signal for the fifth frame to the first STA 110 (or 120). For example, the second STA 120 (or 110) may transmit, to the first STA 110 (or 120), the ACK signal for the fifth frame through a narrowband resource (e.g., a 26-tone RU or a 52-tone RU) allocated based on the ACK request signal for the fifth frame. For example, the ACK signal for the fifth frame may be included in a high efficiency multi-user PPDU (HE MU PPDU). The ACK signal transmission in a narrow band may be advantageous in terms of transmission power. Therefore, even if a usual ACK signal delivery fails (delivery failure) in the second link, the narrow band ACK signal transmitted from the second STA 120 (or 110) through the second link can be successfully received by the first STA 110 (or 120).

The first STA 110 (or 120) may receive an ACK signal for the fifth frame from the second STA 120 (or 110) through the second link. The First STA 110 (or 120) may confirm that the fifth frame has been successfully transmitted to the first STA 110 (or 120).

Figure 26:
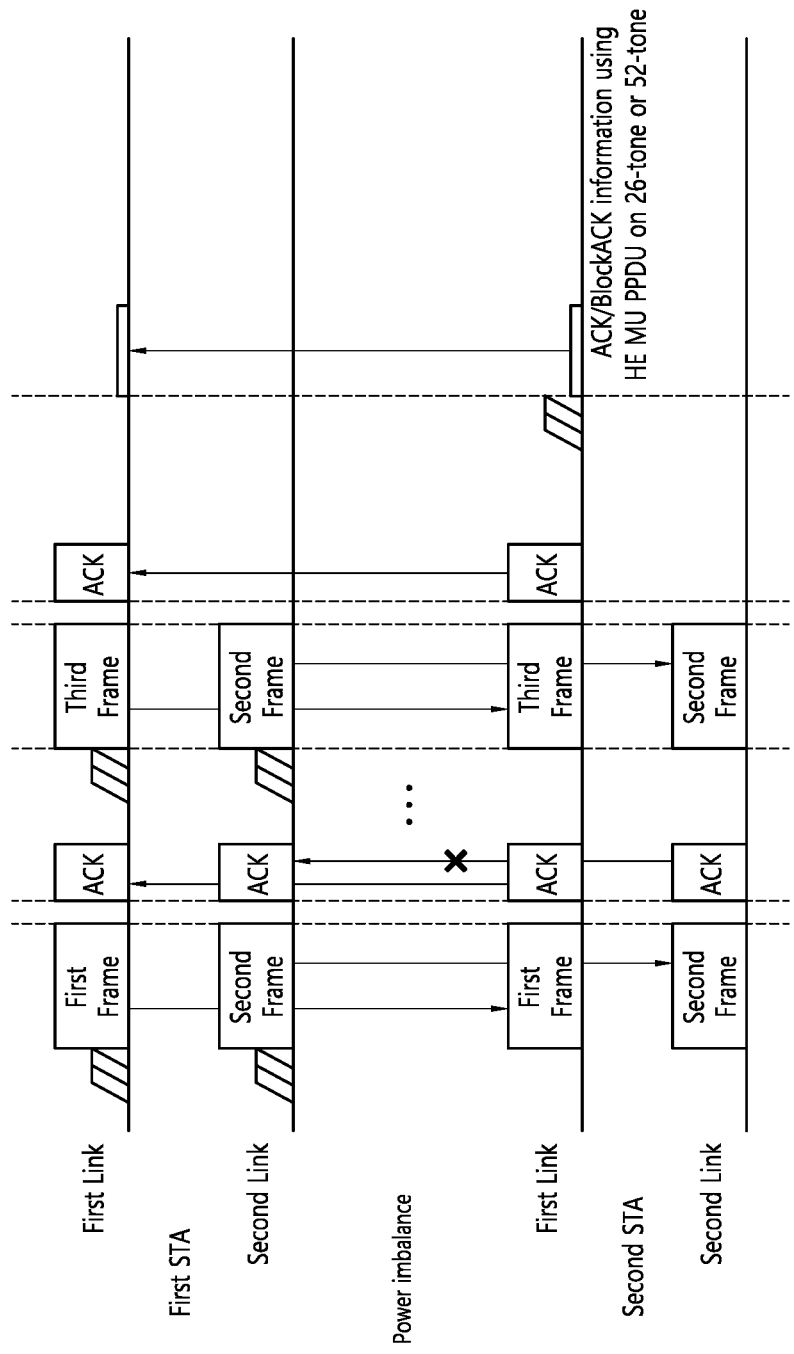
FIG. 26 is a diagram illustrating an embodiment of an ACK delivery method using another link in case of ACK delivery failure.

FIG. 26 is a diagram illustrating an embodiment of an ACK delivery method using another link in case of ACK delivery failure.

Referring to FIG. 26, a first STA 110 (or 120) may transmit a first frame and a second frame to a second STA 120 (or 110) and may receive an ACK signal only for the first frame. The first STA 110 (or 120) may transmit a third frame to the second STA 120 (or 110) and may retransmit the second frame. The second STA 120 (or 110) that have successively/contiguously received the second frame may confirm that the ACK signal for the second frame has failed to be delivered (i.e., delivery failure).

The second STA 120 (or 110) may detect/confirm a delivery failure of an ACK signal for the second frame in a second link. The second STA 120 (or 110) may transmit an ACK signal for the third frame to the first STA 110 (or 120) through a first link. Thereafter, the second STA 120 (or 110) may transmit an ACK signal for the second frame through the first link. For example, the second STA 120 (or 110) can transmit the ACK for the third frame through the first link, and then transmit the ACK signal for the second frame based on the EDCA (Enhanced Distributed Channel Access) to the first link. For example, the ACK signal for the second frame may be transmitted in a narrow band (e.g., a 26-tone RU or a 52-tone RU). For example, the ACK signal for the second frame may be included in a high efficiency multi-user PPDU (HE MU PPDU).

Figure 27:
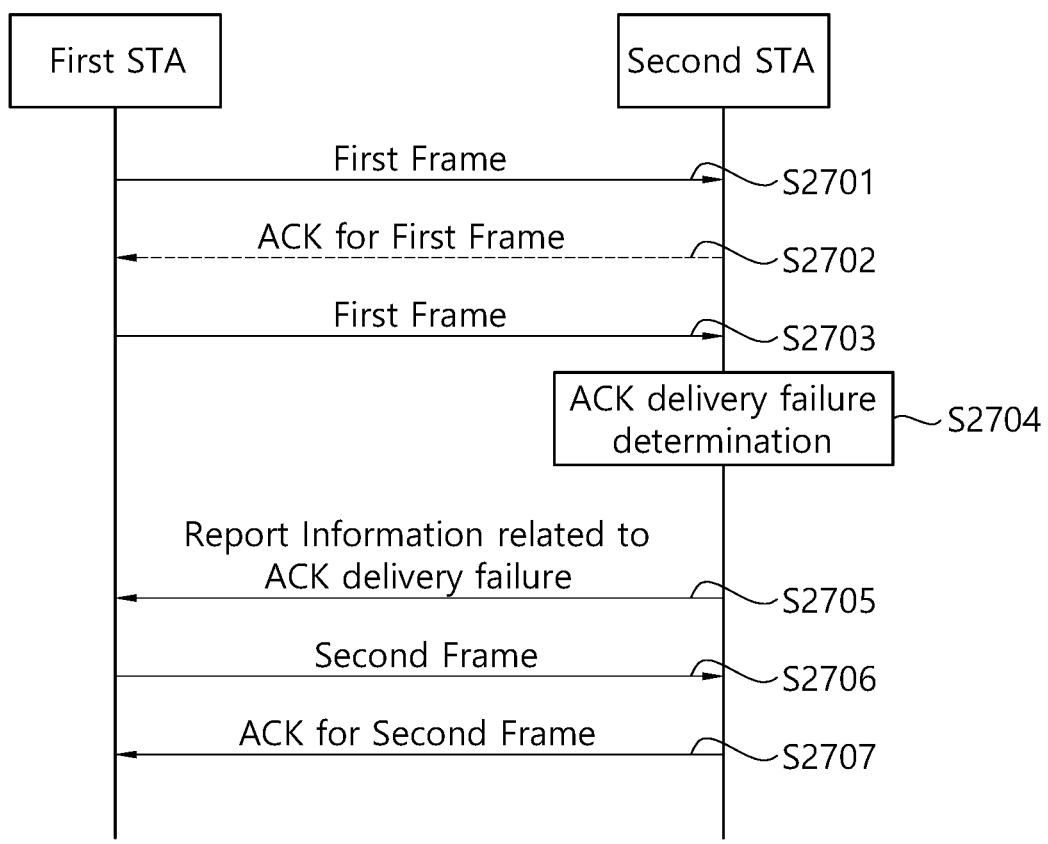
FIG. 27 is a flowchart illustrating an embodiment of a signal transmission method according to an ACK delivery failure.

FIG. 27 is a flowchart illustrating an embodiment of a signal transmission method according to an ACK delivery failure.

Referring to FIG. 27, a first STA 110 (or 120) may transmit a first frame to a second STA 120 (or 110) through a second link, and the second STA 120 (or 110) may receive the first frame from the first STA 110 (or 120) through the second link. The second STA 120 (or 110) may transmit an ACK signal for the first frame to the first STA 110 (or 120) through the second link. In S2702, the first STA 110 (or 120) may not receive an ACK signal for the first frame from the second STA 120 (or 110). Since the first STA 110 (or 120) did not receive the ACK signal for the first frame from the second STA 120 (or 110), the first STA 110 (or 120) may retransmit the first frame to the second STA 120 (or 110) through the second link (S2703).

The second STA 120 (or 110) may determine that transmission of the ACK signal for the first frame has failed based on successively/contiguously receiving the first frame (S2704). The second STA 120 (or 110) may transmit report information related to an ACK signal delivery failure to the first STA 110 (or 120) based on the methods described in FIGS. 22 to 26 (S2705). The first STA 110 (or 120) may receive the report information related to the delivery failure of the ACK signal from the second STA 120 (or 110).

The first STA 110 (or 120) may transmit the second frame to the second STA 120 (or 110) through the second link, and the second STA 120 (or 110) may receive the second frame from the first STA 110 (or 120) through the second link (S2706). The second STA 120 (or 110) may transmit the ACK signal for the second frame in a narrowband based on the methods described in FIGS. 22 to 26 (S2707).

Figure 28:
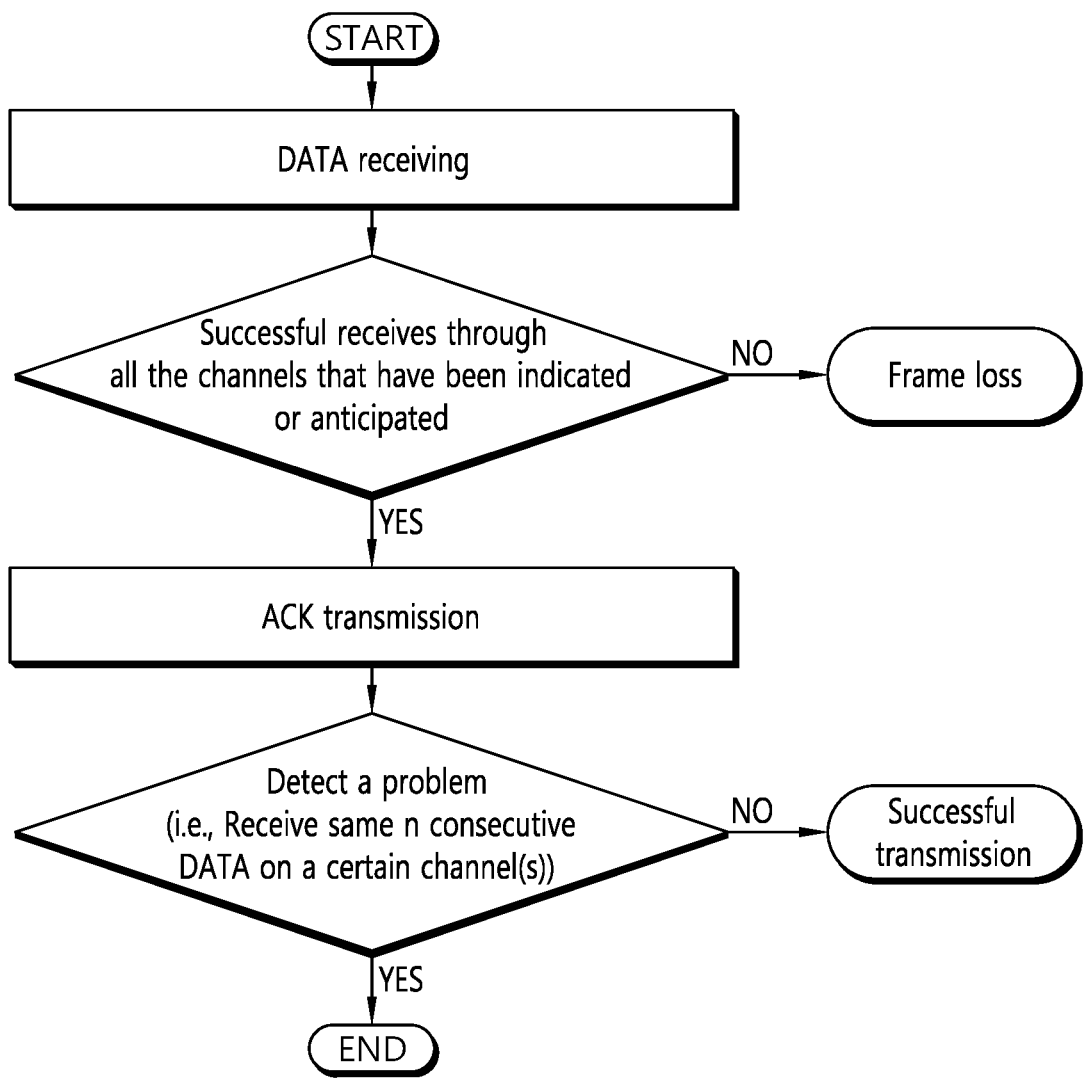
FIG. 28 is a flowchart illustrating an embodiment of a method for transmitting a frame.

FIG. 28 is a flowchart illustrating an embodiment of a method for transmitting a frame.

FIG. 28 describes an operating method of a first STA 110 (or 120) supporting multilinks, and the first STA 110 (or 120) is connected to a second STA 120 (or 110) through a first link and a second link. The first link is configured in a first frequency band, and the second link is configured in a second frequency band.

The first STA 110 (or 120) may receive a frame (e.g., DATA) from the second STA 120 (or 110). The first STA 110 (or 120) may infer based on the previous transmission (or may determine based on transmission link information included in the frame) that a first frame is to be received from the second STA 120 (or 110) through the first link and a second frame is to be received from the second STA 120 (or 110) through the second link. When there is an unreceived frame among the first frame and the second frame, the first STA 110 (or 120) may determine that frame loss has occurred. When frame loss occurs, the first STA 110 (or 120)

may transmit report information related to the frame loss to the second STA 120 (or 110).

When both the first frame and the second frame are received, the first STA 110 (or 120) may transmit an ACK signal for the first frame and the second frame. If the same frame is received several times (e.g., twice) even after transmitting the ACK signal, the first STA 110 (or 120) may determine that it is a power imbalance situation. That is, it may be determined that the frame is successfully received, but transmission of an ACK signal for a successfully received frame has failed. If the same frame is not received multiple times after transmitting the ACK signal, the first STA 110 (or 120) may determine that the frame transmission has been successfully performed.

Figure 29:
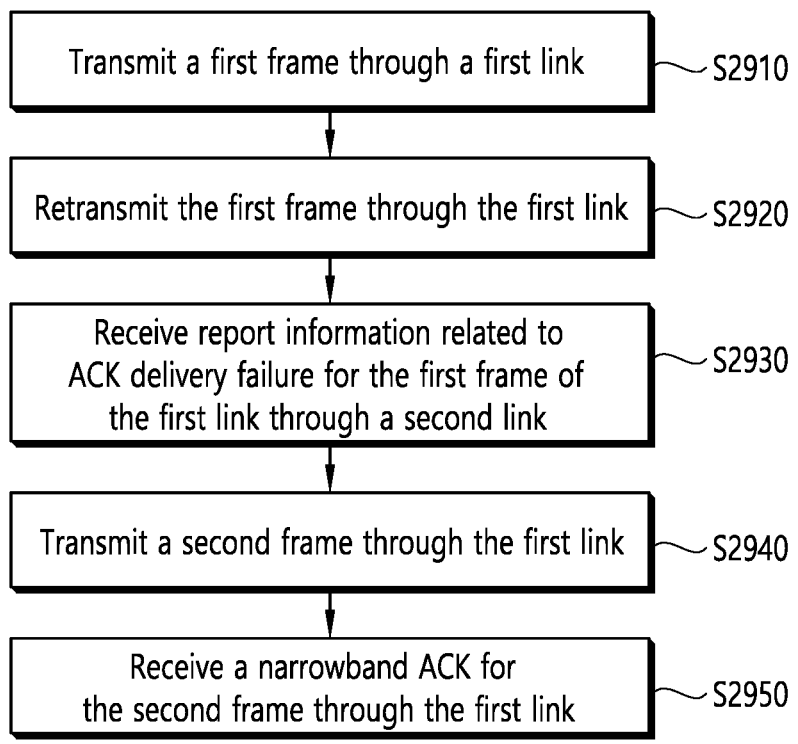
FIG. 29 is a flowchart illustrating an embodiment of an operation of the first STA 110 (or 120) according to FIG. 27.

FIG. 29 is a flowchart illustrating an embodiment of an operation of the first STA 110 (or 120) according to FIG. 27.

A first STA 110 (or 120) and a second STA 120 (or 110) in FIG. 29 may be an example of the first STA 110 (or 120) and the second STA 120 (or 110) in FIG. 27, respectively. The first STA 110 (or 120) may transmit a first frame to the second STA 120 (or 110) through a first link (S2910). The first STA 110 (or 120) may retransmit the first frame to the second STA 120 (or 110) through the first link (S2920). The first STA 110 (or 120) may receive report information related to the delivery failure of the ACK signal for the first frame through a second link from the second STA 120 (or 110) (S2930). Namely, the first STA 110 (or 120) may confirm that the second STA 120 (or 110) has successfully received the first frame and the ACK delivery failure for the first frame transmitted by the second STA 120 (or 110) occurs. The first STA 110 (or 120) may transmit the second frame to the second STA 120 (or 110) through the first link (S2940). The second STA 120 (or 110) may receive a narrowband ACK signal for the second frame through the first link (S2950).

FIG. 30 is a flowchart illustrating an embodiment of an operation of the second STA 120 (or 110) according to FIG. 27.

A first STA 110 (or 120) and a second STA 120 (or 110) in FIG. 30 may be an example of the first STA 110 (or 120) and the second STA 120 (or 110) in FIG. 27, respectively. The second STA 120 (or 110) may receive a first frame through a first link (S3010). The second STA 120 (or 110) may transmit an ACK signal for the first frame to the first STA 110 (or 120) through the first link (S3020). The second STA 120 (or 110) may receive the first frame again through the first link (S3030). The second STA 120 (or 110) may determine that transmission of the ACK signal for the first frame has failed based on successively receiving the same first frame (S3040).

The second STA 120 (or 110) may transmit report information related to an ACK delivery failure for the first frame to the first STA 110 (or 120) through the second link (S3050). The second STA 120 (or 110) may receive the second frame from the first STA 110 (or 120) through the first link (S3060). The second STA 120 (or 110) may transmit a narrowband ACK signal for the second frame through the first link to the first STA 110 (or 120) (S3070).

When the embodiment is implemented as software, the above-described technique may be implemented as a module (or process, function, etc.) that performs the above-described functions. Modules may be stored in a memory and executed by a processor. The memory may be inside or outside the processor, and may be connected to the processor through various well-known means.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims set forth herein may be combined in various ways. For example, the technical features of method claims in the present specification may be combined to be implemented as a device, and the technical features of device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a Wireless Local Area Network (LAN) system, the method comprising:
   confirming, by a first station (STA), a delivery failure of a first acknowledgment (ACK) signal for a first frame received through a first link;
   transmitting, by the first STA to a second STA, report information related to the delivery failure of the first ACK signal through a second link, wherein the report information includes identification information related to the first link;
   receiving, by the first STA, a second frame from the second STA through the first link; and
   transmitting, by the first STA to the second STA, a second ACK signal for the second frame in a narrowband through the first link,
   wherein the report information includes narrowband resource unit (RU) allocation request information.

2. The method of claim 1, wherein the confirming the delivery failure of the first ACK signal comprises:
   receiving, by the first STA, the first frame from the second STA through the first link;
   transmitting, by the first STA to the second STA, the first ACK signal for the first frame through the first link; and
   receiving, by the first STA, the first frame from the second STA through the first link.

3. The method of claim 1, further comprising:
   before transmitting the second ACK signal, receiving, by the first STA, a narrowband ACK request message from the second STA through the first link.

4. The method of claim 1, wherein each of the first and second links is configured in one of 2.4 GHz, 5 GHz or 6 GHz frequency bands, and wherein the first and second links are configured in different frequency bands.

5. The method of claim 1, wherein the report information includes at least one of information related to an ACK policy change request, information related to a reception success of the first frame, and information requesting to transmit a second ACK in a narrowband.

6. The method of claim 1, wherein the narrowband includes 26 resource units (RUs) or 52 RUs.

7. A first station (STA) in a Wireless Local Area Network (LAN) system, the first STA comprising:
   a transceiver configured for transmitting and/or receiving a wireless signal;
   a processor coupled to the transceiver,
   wherein the processor is further configured for:
   confirming, a delivery failure of a first acknowledgment (ACK) signal for a first frame received through a first link;
   transmitting, to a second STA, report information related to the delivery failure of the first ACK signal through a second link, wherein the report information includes identification information related to the first link;
   receiving a second frame from the second STA through the first link; and
   transmitting, to the second STA, a second ACK signal for the second frame in a narrowband through the first link,
   wherein the report information includes narrowband resource unit (RU) allocation request information.

8. The first STA of claim 7, wherein the confirming the delivery failure of the first ACK signal comprises:
   receiving the first frame from the second STA through the first link;
   transmitting, to the second STA, the first ACK signal for the first frame through the first link; and
   receiving the first frame from the second STA through the first link.

9. The first STA of claim 7, wherein the processor is further configured for:
   before transmitting the second ACK signal, receiving a narrowband ACK request message from the second STA through the first link.

10. The first STA of claim 7, wherein each of the first and second links is configured in one of 2.4 GHz, 5 GHz or 6 GHz frequency bands, and wherein the first and second links are configured in different frequency bands.

11. The first STA of claim 7, wherein the report information includes at least one of information related to an ACK policy change request, information related to a reception success of the first frame, and information requesting to transmit a second ACK in a narrowband.

12. The first STA of claim 7, wherein the narrowband includes 26 resource units (RUs) or 52 RUs.

* * * * *